US012579887B1

(12) United States Patent
Mulligan et al.

(10) Patent No.: US 12,579,887 B1
(45) **Date of Patent: *Mar. 17, 2026**

(54) SYSTEMS, METHODS, AND DEVICES FOR COMMUNICATION BETWEEN TRAFFIC CONTROLLER SYSTEMS AND MOBILE TRANSMITTERS AND RECEIVERS

(71) Applicant: Applied Information, Inc., Suwanee, GA (US)

(72) Inventors: Bryan Patrick Mulligan, Suwanee, GA (US); Iain Jeffrey Mulligan, Alpharetta, GA (US)

(73) Assignee: Applied Information, Inc., Suwanee, GA (US)

( * ) Notice: Subject to any disclaimer, the term of this patent is extended or adjusted under 35 U.S.C. 154(b) by 626 days.

This patent is subject to a terminal disclaimer.

(21) Appl. No.: 17/579,200

(22) Filed: Jan. 19, 2022

Related U.S. Application Data

(63) Continuation-in-part of application No. 17/101,902, filed on Nov. 23, 2020, now Pat. No. 11,594,127,
(Continued)

(51) Int. Cl.
*G08G 1/087* (2006.01)
*G08G 1/01* (2006.01)
(Continued)

(52) U.S. Cl.
CPC ........... *G08G 1/087* (2013.01); *G08G 1/0116* (2013.01); *G08G 1/012* (2013.01); *G08G 1/0141* (2013.01); *G08G 1/091* (2013.01); *G08G 1/095* (2013.01)

(58) Field of Classification Search
CPC ...... G08G 1/087; G08G 1/0116; G08G 1/012; G08G 1/0141; G08G 1/091; G08G 1/095
See application file for complete search history.

(56) References Cited

U.S. PATENT DOCUMENTS 4,101,191 A 7/1978 Gould et al.
5,153,525 A 10/1992 Hoekman et al.
(Continued)

FOREIGN PATENT DOCUMENTS

CN 202049621 U 11/2011
CN 107967818 A 4/2018
(Continued)

OTHER PUBLICATIONS

Chavan S.S., et al., "Design of Intelligent Traffic Light Controller Using Embedded System," Second International Conference on Emerging Trends in Engineering and Technology, ICETET-09, 2009, pp. 1086-1091, Dec. 16, 2009.
(Continued)

*Primary Examiner* — Hussein Elchanti
(74) *Attorney, Agent, or Firm* — Bradley Arant Boult Cummings LLP; Daniel E. Sineway, Esq.

(57) ABSTRACT

A computer-implemented method in which one or more processing devices perform operations may include receiving, at a traffic controller unit associated with a traffic-signaling device, information associated with a traffic-related triggering event. The computer-implemented method may also include determining that the information indicates an occurrence of the traffic-related triggering event. Further, the computer-implemented method may include causing the traffic controller unit to transmit signal, phase, and timing (SPAT) messages of the traffic-signaling device to at least one device external to the traffic controller unit in response to determining the occurrence of the traffic-related triggering event.

23 Claims, 15 Drawing Sheets

Related U.S. Application Data which is a continuation of application No. 16/272,803, filed on Feb. 11, 2019, now Pat. No. 11,069,234.

(60) Provisional application No. 62/628,593, filed on Feb. 9, 2018.

(51) Int. Cl.

| | |
|---|---|
| ***G08G 1/09*** | (2006.01) |
| ***G08G 1/095*** | (2006.01) |

(56) References Cited

U.S. PATENT DOCUMENTS

| | | | | |
|---|---|---|---|---|
| 5,172,113 | A | 12/1992 | Hamer | |
| 5,187,373 | A | 2/1993 | Gregori | |
| 5,187,476 | A | 2/1993 | Hamer | |
| 5,202,683 | A | 4/1993 | Hamer et al. | |
| 5,278,555 | A | 1/1994 | Hoekman | |
| 5,281,965 | A | 1/1994 | Hoekman et al. | |
| 5,508,698 | A | 4/1996 | Hoekman | |
| 5,523,753 | A | 6/1996 | Fedde et al. | |
| 5,539,398 | A | 7/1996 | Hall et al. | |
| 5,602,739 | A | 2/1997 | Haagenstad et al. | |
| 5,621,645 | A | 4/1997 | Brady | |
| 5,734,338 | A | 3/1998 | Hoekman et al. | |
| 5,745,865 | A | 4/1998 | Rostoker et al. | |
| 5,751,225 | A | 5/1998 | Fedde et al. | |
| 5,850,192 | A | 12/1998 | Turk et al. | |
| 5,926,113 | A | 7/1999 | Jones et al. | |
| 5,955,968 | A | 9/1999 | Bentrott et al. | |
| 5,986,575 | A | 11/1999 | Jones et al. | |
| 6,133,854 | A | 10/2000 | Yee et al. | |
| 6,243,026 | B1 | 6/2001 | Jones et al. | |
| 6,326,903 | B1 | 12/2001 | Gross et al. | |
| 6,621,420 | B1 | 9/2003 | Poursartip | |
| 6,870,489 | B2 | 3/2005 | Cybulski | |
| 6,940,422 | B1 | 9/2005 | Bachelder et al. | |
| 6,958,707 | B1 | 10/2005 | Siegel | |
| 6,989,766 | B2 | 1/2006 | Mese et al. | |
| 7,307,547 | B2 | 12/2007 | Schwartz | |
| 7,317,406 | B2 | 1/2008 | Wolterman | |
| 7,327,280 | B2 | 2/2008 | Bachelder et al. | |
| 7,333,028 | B2 | 2/2008 | Schwartz | |
| 7,417,560 | B2 | 8/2008 | Schwartz | |
| 7,432,826 | B2 | 10/2008 | Schwartz | |
| 7,515,064 | B2 | 4/2009 | Schwartz | |
| 7,573,399 | B2 | 8/2009 | Schwartz | |
| 7,642,928 | B2 | 1/2010 | Hutchison | |
| 7,647,180 | B2 | 1/2010 | Breed | |
| 7,663,505 | B2 | 2/2010 | Publicover | |
| 7,808,401 | B1 | 10/2010 | Schwartz et al. | |
| 7,868,783 | B2 | 1/2011 | Bachelder | |
| 7,952,491 | B2 | 5/2011 | Schwartz et al. | |
| 7,982,631 | B2 | 7/2011 | Schwartz et al. | |
| 8,031,062 | B2 | 10/2011 | Smith | |
| 8,054,202 | B1 | 11/2011 | Sikora et al. | |
| 8,072,346 | B2 | 12/2011 | Hall et al. | |
| 8,319,662 | B1 | 11/2012 | Bontemps et al. | |
| 8,325,062 | B2 | 12/2012 | Johnson | |
| 8,344,908 | B2 | 1/2013 | Johnson | |
| 8,373,578 | B1 | 2/2013 | Sikora et al. | |
| 8,487,780 | B2 | 7/2013 | Edwardson | |
| 8,610,596 | B2 | 12/2013 | Johnson | |
| 8,618,954 | B2 | 12/2013 | Free | |
| 8,700,299 | B2 * | 4/2014 | Morita | G08G 1/096716 701/123 |
| 8,773,282 | B2 | 7/2014 | Cross | |
| 8,783,626 | B2 | 7/2014 | Cross | |
| 8,823,548 | B2 | 9/2014 | Johnson et al. | |
| 8,830,085 | B2 | 9/2014 | Edwardson et al. | |
| 8,878,695 | B2 | 11/2014 | Cross | |
| 8,884,783 | B2 | 11/2014 | Roberts et al. | |
| 8,912,922 | B2 | 12/2014 | Eichhorst | |
| 8,972,145 | B2 | 3/2015 | Mahler et al. | |
| 9,208,684 | B2 | 12/2015 | Lee et al. | |
| 9,299,253 | B2 | 3/2016 | Eichhorst | |
| 9,302,687 | B2 | 4/2016 | Cross | |
| 9,330,566 | B2 | 5/2016 | Cross | |
| 9,361,798 | B2 | 6/2016 | Neuman | |
| 9,460,620 | B2 | 10/2016 | Evans | |
| 9,478,131 | B2 | 10/2016 | Eichhorst | |
| 9,536,427 | B2 | 1/2017 | Tonguz et al. | |
| 9,542,852 | B2 | 1/2017 | Cross et al. | |
| 9,564,049 | B2 | 2/2017 | Diba | |
| 9,646,496 | B1 * | 5/2017 | Miller | H04W 4/029 |
| 9,751,543 | B2 | 9/2017 | Cross | |
| 9,773,411 | B2 | 9/2017 | Popple | |
| 9,799,221 | B2 | 10/2017 | Baller | |
| 9,911,334 | B2 | 3/2018 | Townsend | |
| 9,916,759 | B2 | 3/2018 | Cross | |
| 9,922,559 | B1 | 3/2018 | Inoue | |
| 9,928,738 | B2 | 3/2018 | Bauer et al. | |
| 9,947,219 | B2 | 4/2018 | Rolle et al. | |
| 9,953,522 | B2 | 4/2018 | Cross et al. | |
| 9,965,951 | B1 | 5/2018 | Gallagher et al. | |
| 9,978,270 | B2 | 5/2018 | Raamot | |
| 9,990,548 | B2 | 6/2018 | Wellington et al. | |
| 10,019,898 | B2 | 7/2018 | Miller | |
| 10,029,716 | B2 | 7/2018 | Cross et al. | |
| 10,121,370 | B2 | 11/2018 | Elsheemy | |
| 10,127,811 | B2 | 11/2018 | Xu et al. | |
| 10,198,947 | B2 | 2/2019 | Meyer et al. | |
| 10,217,356 | B2 | 2/2019 | Baller | |
| 10,311,725 | B2 | 6/2019 | Cross et al. | |
| 10,365,115 | B2 * | 7/2019 | Nair | G08G 1/0145 |
| 10,650,673 | B1 | 5/2020 | Elsheemy | |
| 11,030,895 | B1 | 6/2021 | Kulus et al. | |
| 11,069,234 | B1 * | 7/2021 | Mulligan | G08G 1/087 |
| 11,158,189 | B2 | 10/2021 | Edwardson et al. | |
| 11,200,802 | B1 | 12/2021 | Edwardson | |
| 11,232,707 | B1 | 1/2022 | Kulus et al. | |
| 11,237,554 | B2 * | 2/2022 | Rezaeian | G06F 3/013 |
| 2002/0027510 | A1 | 3/2002 | Jones et al. | |
| 2004/0196162 | A1 | 10/2004 | Brooke | |
| 2005/0104745 | A1 * | 5/2005 | Bachelder | G08G 1/01 340/988 |
| 2005/0187701 | A1 * | 8/2005 | Baney | G08G 1/096716 340/907 |
| 2009/0167561 | A1 * | 7/2009 | Liang | G08G 1/095 340/907 |
| 2009/0287401 | A1 * | 11/2009 | Levine | G08G 1/096805 701/117 |
| 2010/0030458 | A1 * | 2/2010 | Coughlin | B60W 40/09 701/123 |
| 2010/0082190 | A1 * | 4/2010 | Jinno | B60K 6/52 903/918 |
| 2010/0171640 | A1 * | 7/2010 | Delia | G08G 1/07 340/907 |
| 2010/0308986 | A1 * | 12/2010 | Dobryden | G08C 17/02 340/439 |
| 2011/0043348 | A1 * | 2/2011 | Blackard | F16H 63/42 340/439 |
| 2011/0076948 | A1 | 3/2011 | Jabara et al. | |
| 2011/0126797 | A1 * | 6/2011 | Russell | F02D 19/0692 123/294 |
| 2011/0304476 | A1 | 12/2011 | Johnson et al. | |
| 2012/0218126 | A1 | 8/2012 | Roberts et al. | |
| 2014/0336913 | A1 * | 11/2014 | Fino | G08G 1/0112 701/465 |
| 2015/0145995 | A1 * | 5/2015 | Shahraray | H04W 4/70 348/148 |
| 2015/0154860 | A1 * | 6/2015 | Holzwanger | G08G 1/005 340/944 |
| 2015/0213713 | A1 | 7/2015 | Taylor | |
| 2016/0063859 | A1 | 3/2016 | Leung | |
| 2016/0148267 | A1 | 5/2016 | Pittman et al. | |
| 2016/0148507 | A1 * | 5/2016 | Pittman | G06Q 30/0255 340/917 |
| 2016/0161274 | A1 | 6/2016 | Mach et al. | |
| 2016/0358463 | A1 * | 12/2016 | Cho | G08G 1/0145 |
| 2017/0025015 | A1 | 1/2017 | Thompson et al. | |
| 2017/0124868 | A1 * | 5/2017 | Bhat | G08G 1/09623 |
| 2017/0154525 | A1 * | 6/2017 | Zou | G08G 1/095 |

(56) References Cited

U.S. PATENT DOCUMENTS

| | | | |
|---|---|---|---|
| 2017/0301237 | A1 | 10/2017 | Macneille et al. |
| 2017/0372602 | A1 | 12/2017 | Gilliland et al. |
| 2018/0047286 | A1 | 2/2018 | Gage et al. |
| 2018/0075739 | A1* | 3/2018 | Ginsberg ......... G08G 1/096816 |
| 2018/0090009 | A1 | 3/2018 | Roessler et al. |
| 2018/0096595 | A1 | 4/2018 | Janzen et al. |
| 2018/0144203 | A1 | 5/2018 | Moosaei et al. |
| 2018/0151064 | A1* | 5/2018 | Xu ........................ G08G 1/0125 |
| 2018/0157258 | A1* | 6/2018 | O'Brien ............... G05D 1/0088 |
| 2018/0190111 | A1 | 7/2018 | Green et al. |
| 2018/0253968 | A1* | 9/2018 | Yalla ...................... G08G 1/097 |
| 2018/0253974 | A1 | 9/2018 | Szulc et al. |
| 2018/0261083 | A1* | 9/2018 | Sun ........................ G08G 1/012 |
| 2018/0268692 | A1 | 9/2018 | Takada et al. |
| 2018/0286228 | A1* | 10/2018 | Xu ........................ G08G 1/0145 |
| 2018/0324694 | A1* | 11/2018 | Uchiyama ............. H04W 76/28 |
| 2019/0019410 | A1 | 1/2019 | Sheynman et al. |
| 2019/0080186 | A1* | 3/2019 | Zhai ..................... G05D 1/0246 |
| 2019/0082377 | A1* | 3/2019 | Silver ................... B60W 50/14 |
| 2019/0086219 | A1* | 3/2019 | Hashisho ............. G05D 1/0223 |
| 2019/0122178 | A1* | 4/2019 | Kempf ........... G06Q 10/063114 |
| 2019/0122548 | A1* | 4/2019 | Sakuma ................... G08G 1/08 |
| 2019/0172346 | A1 | 6/2019 | Barker |
| 2019/0180617 | A1* | 6/2019 | Hori .................. B60W 50/0097 |
| 2019/0228593 | A1* | 7/2019 | Liu .................. G08G 1/096872 |
| 2019/0272747 | A1* | 9/2019 | Raamot .................. G08G 1/052 |
| 2020/0184238 | A1* | 6/2020 | Kobayashi ........... G06V 40/161 |
| 2020/0242922 | A1 | 7/2020 | Dulberg et al. |
| 2022/0003562 | A1 | 1/2022 | Mack et al. |

FOREIGN PATENT DOCUMENTS

| | | | |
|---|---|---|---|
| DE | 102014204059 | A1 | 9/2015 |
| IN | 222014 | | 5/2014 |
| WO | 2017215365 | A1 | 12/2017 |

OTHER PUBLICATIONS

Goel S., et al., "Self-Organization in Traffic Lights; Evolution of Signal Control With Advances in Sensors and Communications," Jun. 18, 2017, 54 Pages.

ITERIS: "TransitHelper," 2018, 4 Pages, Retrieved from URL: https://www.iteris.com/products/communications/transithelper.

Jagadeesh Y.M., et al., "Smart Autonomous Traffic Light Switching by Traffic Density Measurement Through Sensors," International Conference on Computers, Communications and Systems, Jan. 1, 2015, pp. 123-126.

Mlinaric M., "Intelligent Traffic Control With Priority for Emergency Vehicles," Masters Thesis, Dec. 31, 2016, 76 Pages.

Talas M., "Connected Vehicle Challenges for the Dense Urban Environment," Institute of Transportation Engineers, ITE Journal, Dec. 2018, vol. 88, No. 12, pp. 30-35, 8 Pages.

Younis O., et al., "Employing Cyber-Physical Systems: Dynamic Traffic Light Control at Road Intersections," IEEE Internet of Things Journal, Dec. 2017, vol. 4, No. 6, pp. 2286-2296.

Notice of Allowance for U.S. Appl. No. 17/101,895, mailed Nov. 7, 2023, 7 Pages.

Non-Final Office Action for U.S. Appl. No. 18/160,640 dated Jun. 27, 2024, 23 pages.

Non-Final Office Action for U.S. Appl. No. 17/579,193 dated Jun. 14, 2024, 28 pages.

* cited by examiner

SYSTEMS, METHODS, AND DEVICES FOR COMMUNICATION BETWEEN TRAFFIC CONTROLLER SYSTEMS AND MOBILE TRANSMITTERS AND RECEIVERS

CROSS REFERENCE TO RELATED APPLICATIONS

This application is a continuation-in-part patent application of, and claims the benefit of and priority to, U.S. Non-Provisional patent application Ser. No. 17/101,902, filed on Nov. 23, 2020, and entitled "SYSTEMS, METHODS, AND DEVICES FOR COMMUNICATION BETWEEN TRAFFIC CONTROLLER SYSTEMS AND MOBILE TRANSMITTERS AND RECEIVERS," which claims benefit of and priority to U.S. Non-Provisional patent application Ser. No. 16/272,803, now U.S. Pat. No. 11,069,234, filed on Feb. 11, 2019, and entitled "SYSTEMS, METHODS, AND DEVICES FOR COMMUNICATION BETWEEN TRAFFIC CONTROLLER SYSTEMS AND MOBILE TRANSMITTERS AND RECEIVERS," which claims the benefit of and priority to U.S. Provisional Patent Application No. 62/628,593, filed on Feb. 9, 2018, and entitled "SYSTEMS, METHODS, AND DEVICES FOR COMMUNICATION BETWEEN TRAFFIC CONTROLLER SYSTEMS AND MOBILE TRANSMITTERS AND RECEIVERS," the disclosures of which are incorporated by reference in their entireties as if the same were fully set forth herein.

TECHNICAL FIELD

The present systems, methods, and devices relate generally to traffic management systems, and more particularly to systems, methods, and devices for modifying a present or future traffic light state, and receiving traffic related alerts.

BACKGROUND

The technology included in conventional traffic controllers and lighting systems has largely remained unchanged for the past century. Generally, controller boxes regulate the states of one or more lights at intersections, crosswalks, beacons, etc., for dictating the right-of-way for drivers and pedestrians. Despite the seemingly acceptable functionality of preexisting traffic systems, modern technology is rapidly outpacing the status quo. Technological advancements such the growth of the internet-of-things (IoT), radio frequency and cellular communications, and even machine learning have allowed for improvements in the way people engage in transportation (e.g., autonomous driving, GPS navigation, in-car audio systems, etc.). These technological capabilities were not contemplated when designing conventional traffic controlling systems. Therefore, there exists a long felt but unresolved need for systems, methods, and apparatuses that improve traffic controllers by connecting the mobile phones, automobiles, or other communication hardware available to drivers and pedestrians alike to the systems that regulate traffic for improving the safety and overall experience of citizens on the road.

BRIEF SUMMARY OF DISCLOSURE

The present systems, methods, and devices relate generally to the management of traffic controllers and traffic lights/signals based on cellular and/or radio frequency data transmitted to and received from mobile devices, automobiles, or other communication hardware available to drivers and pedestrians. In one embodiment, the system, methods, and devices discussed in the present disclosure aim to improve outdated and conventional traffic controllers by integrating hardware and software solutions that allow for traffic related data to be shared between the traffic controllers, drivers, and pedestrians to promote a safer, more efficient, and overall enhanced traffic environment.

Consider, for example, a scenario where an emergency response vehicle (or the like) is travelling on a particular route and is approaching an intersection. Conventional traffic control systems (controller boxes located at every intersection which control the state of traffic lights) are not equipped to accommodate the emergency response vehicle in the event that it encounters a red traffic light, or even a generally busy and congested intersection. In this scenario, the emergency response vehicle relies solely on the sounding sirens and lights to alert drivers about the incoming emergency response vehicle, which is not always effective. As is well known by anyone who has operated a motor vehicle, it is not always easy to determine how far away an approaching emergency response vehicle is, what direction it is approaching from, and in some instances the sirens and lights may not be noticeable until it is too late. These types of scenarios often cause confusion amongst drivers and are generally unsafe for all parties involved.

Embodiments of the present systems, methods, and devices allow for traffic controllers to communicate with motor vehicles (e.g., emergency response vehicles, civilian operated motor vehicles, etc.) and pedestrians in order to manipulate traffic to allow for particular vehicles to pass through certain areas without complications.

Another example of applications for embodiments of the present disclosure include the ability for the present systems, methods, and devices to provide drivers with sensory ques (e.g., visual and audible) regarding upcoming traffic states via the drivers' mobile devices or displays integrated with the drivers' automobiles (e.g., navigation systems, dashboard touch screens, etc.). In one embodiment, a driver may be approaching a particular intersection or stop sign that is nearby but still not visible (e.g., the driver's line of sight is obstructed by a natural landmark, building, etc.). In this embodiment, the automobile's audio/visual system, or the mobile computing device of the driver, may present the driver with visual and/or audio ques about the upcoming traffic state. For example, if the driver was approaching a stop sign, the mobile device speaker or automobile sound system may audibly produce an audio que such as "Stop sign ahead," and a display may present the user with a visual indication of where the stop sign is in relation to the vehicle, how many drivers are currently waiting at the stop sign, etc. If the driver was approaching an intersection, the driver may be presented with a visual indication that the light is currently green, yellow, or red, prior to the driver's ability to see the physical light structure. This visual indication may be presented in various ways, such as replicating the traffic light layout on a mobile device screen, dashboard touchscreen, or hologram display integrated within the windshield. For example, the visual indication may resemble two arrows, a straight arrow and a left-curved arrow. In this example, the straight arrow may be green, indicating that the current state of the traffic light allows for drivers to continue through the light without stopping. Continuing with this example, the left-curved arrow may be red, indicating that the current state of the traffic light requires drivers intending to turn left to wait for the light state to switch to green. According to various embodiments, the arrows may be represented as two dimensional icons on a flat display such as an LCD or LED screen, or the arrows may be presented as a semi-transparent hologram or projection within a glass pane.

In some embodiments, the system may track the timing of certain traffic lights, thereby allowing the system to present drivers with information such as when the light will turn from one state to another. Furthermore, the system may present these ques, alerts, and notifications audibly. In one embodiment, a driver may be stopped at a red light and not paying attention to the status of the traffic light (e.g., checking his/her emails on his/her mobile device). In this scenario, the system may present the user with an audible que, such as sounding “Get ready for green,” which notifies the driver that the light will soon change from red to green. This allows for the driver to be prepared to begin moving his/her vehicle promptly, which may reduce overall traffic due to the decrease of propagated wait times that result from distracted drivers and delayed action at green lights. To do so, however, the present system should have knowledge of the impending change to “green” of the relevant traffic light.

In some embodiments, the functionality of the present systems, methods, and devices, may be implemented in or promote the development of autonomous driving vehicles. As will be described in further detail herein, the data transmitted and received between traffic controlling systems and the mobile devices of the vehicle drivers (or the vehicles themselves) may provide the traffic data for coordinating a safe environment for a hands-off driving ecosystem.

According to various aspects of the present disclosure, an exemplary environment where the present systems may operate includes components such as radio frequency (RF) transmitters and receivers, cellular data transmitters and receivers (e.g., mobile phones or standalone components), traffic hardware (e.g., stoplights, beacons, curve warning, stop sign approaching, etc.) and their corresponding HW/SW controller systems, and a wireless communications network. In one embodiment, implementations of the systems and methods include a back-and-forth communication of data between the driver/vehicle and the traffic controllers, the data including information such as GPS, intersection geometry, identification data, priority data (e.g., emergency response vehicle data), etc., and this data is used to further coordinate safer traffic ecosystems and also provide drivers with enhanced insight into traffic states and conditions.

In some embodiments, a cloud-based server may also be included in the system. In one embodiment, the cloud-based server may allow for remote computing of particular traffic-related messages, as well as facilitate communication between system components.

In various embodiments, the present disclosure discusses a method including the steps of: receiving, at a mobile computing device, MAP data corresponding to a plurality of intersections, the MAP data including intersection geometry corresponding to each of the plurality of intersections, wherein the intersection geometry includes coordinates corresponding to a physical layout of each of the plurality of intersections; receiving signal, phase, and timing (SPAT) data, the SPAT data including one or more traffic light states at the plurality of intersections; determining a GPS position and a velocity of the mobile computing device; comparing at least the GPS position and the velocity associated with the mobile computing device to the coordinates corresponding to the physical layout of each of the plurality of intersections of the MAP data to determine relevant SPAT data, wherein the relevant SPAT data corresponds to a particular intersection determined to be an approaching intersection based on the GPS position and velocity of the mobile computing device; and generating an alert corresponding to the approaching intersection, wherein the alert is presented via the mobile computing device and corresponds to the one or more traffic light states associated with the relevant SPAT data.

In one embodiment, the one or more traffic light states includes a traffic light color and a traffic light timer. In various embodiments, the one or more traffic light states includes data corresponding to current and/or future states at the plurality of intersections. In a particular embodiment, the alert includes displaying a notification on a digital screen at the mobile computing device, the notification including an indication of the physical layout of the approaching intersection, wherein the indication of the physical layout includes arrows arranged and colored according to the MAP data and the traffic light color. In certain embodiments, the alert further includes displaying a visual representation of the traffic light timer on the digital screen, and wherein the traffic light timer corresponds to a scheduled change to the one or more traffic light states.

According to various aspects of the present disclosure, and in response to the scheduled change to the one or more traffic light states, the method further includes the step of generating an updated alert for presenting the change to the one or more traffic light states. In some embodiments, the method further includes the step of generating an audible cue corresponding to the alert, wherein the audible cue is announced via a speaker at the mobile computing device. In a particular embodiment, the audible cue includes the phrase “Get ready for green!”

In various embodiments, the present disclosure discusses a system for generating traffic-related alerts, the system including: a plurality of computing devices, each of the plurality of computing devices including a processor running a software application and operable to present software application views on a digital display at each the plurality of computing devices, wherein each of the plurality of computing devices further includes a cellular communication module and computer memory for cataloging MAP data corresponding to intersection geometry associated with a plurality of traffic intersections, the intersection geometry including coordinates corresponding to a physical layout of each of the plurality of traffic intersections; and a plurality of processing units at a plurality of traffic intersection controllers corresponding to the plurality of traffic intersections, wherein each of the plurality of processing units include a cellular modem, and the processing units are operable to: transmit, via the cellular modem, MAP data to the plurality of computing devices for cataloging the MAP data at the plurality of computing devices; and in response to determining an event including a change to one or more traffic light states at the plurality of traffic intersections, transmit signal, phase, and timing (“SPAT”) data corresponding to the one or more traffic light states, wherein each of the plurality of computing devices compares the coordinates corresponding to the physical layout of each of the plurality of traffic intersections of the MAP data to a determined velocity and GPS location of the mobile computing device to determine relevant SPAT data corresponding to a particular intersection determined to be an approaching intersection based on the GPS location and velocity, and generates an approaching traffic scenario to be presented on the digital display as a software application view, wherein the approaching traffic scenario includes visual representations of the one or more traffic light states.

In one embodiment, the one or more traffic light states includes a traffic light color and a traffic light timer. In various embodiments, the one or more traffic light states include data corresponding to the current and/or future states at the plurality of traffic intersections. In particular embodiments, the approaching traffic scenario includes a visual representation of the physical layout of the approaching intersection, wherein the visual representation of the physical layout includes arrows arranged and colored according to the MAP data and traffic light color. In certain embodiments, the approaching traffic scenario further includes displaying a visual representation of the traffic light timer on the digital screen, and wherein the traffic light timer corresponds to a scheduled change to the one or more traffic light states.

According to various aspects of the present disclosure, in response to the scheduled change to the one or more traffic light states, the processing units are further operable to generate an updated approaching traffic scenario for visually representing the change to the one or more traffic light states. In certain embodiments, the approaching traffic scenario includes an audible cue announced via a speaker at the mobile computing device. In one embodiment, the audible cue includes the phrase "Get ready for green!" In a particular embodiment, the plurality of computing devices are smart phones and/or on-board automobile computing systems.

According to one aspect, a computer-implemented method in which one or more processing devices perform operations including: receiving, at a traffic controller unit associated with a traffic-signaling device, information associated with a traffic-related triggering event; determining that the information indicates an occurrence of the traffic-related triggering event; and causing the traffic controller unit to transmit signal, phase, and timing (SPAT) messages of the traffic-signaling device to at least one device external to the traffic controller unit in response to determining the occurrence of the traffic-related triggering event.

According to a further aspect of the computer-implemented method or any other aspect, the traffic-related triggering event includes detection of an approach of a pedestrian or a vehicle at the traffic-signaling device.

According to a further aspect of the computer-implemented method or any other aspect, the at least one device external to the traffic controller unit includes a mobile device located on the pedestrian or the vehicle and configured to receive the SPAT messages from the traffic controller unit.

According to a further aspect of the computer-implemented method or any other aspect, the traffic-related triggering event includes (i) a change to a present or future state of a light at the traffic-signaling device or (ii) exceeding a predetermined signal timer at the traffic-signaling device, wherein the predetermined signal timer corresponds to a particular traffic light state.

According to a further aspect of the computer-implemented method or any other aspect, the information associated with the traffic-related triggering event includes travel-related information messages received from a mobile device located on a vehicle or an individual.

According to a further aspect of the computer-implemented method or any other aspect, the travel-related information messages include data relating to a past or current traffic-related activity of the vehicle, and wherein the data includes vehicle position, speed, heading, acceleration, vehicle size, vehicle mass, steering wheel angle, braking data, and associated time stamps.

According to a further aspect of the computer-implemented method or any other aspect, the travel-related information messages include data relating to a past or current traffic-related activity of the individual, and wherein the data includes position, speed, heading, acceleration, and associated time stamps.

According to a further aspect of the computer-implemented method or any other aspect, the operation of causing the traffic controller unit to transmit the SPAT messages of the traffic-signaling device to the at least one device external to the traffic controller includes: transmitting the SPAT messages to a cloud-based server, wherein the cloud-based server is configured to communicate with one or more mobile devices located on a pedestrian or a vehicle.

According to a further aspect of the computer-implemented method or any other aspect, the SPAT message includes a future status, a current status, or both of the traffic-signaling device.

According to one aspect, system includes: a traffic-signaling device; and a traffic controller unit associated with the traffic-signaling device, wherein the traffic controller unit includes: a processor; and a non-transitory computer-readable medium having instructions stored thereon, the instructions executable by the processor for performing operations including: receiving information associated with a traffic-related triggering event; determining that the information indicates an occurrence of the traffic-related triggering event; and causing the traffic controller unit to transmit signal, phase, and timing (SPAT) messages of the traffic-signaling device to at least one device external to the traffic controller unit in response to determining the occurrence of the traffic-related triggering event.

According to a further aspect of the system or any other aspect, the traffic-related triggering event includes detection of an approach of a pedestrian or a vehicle at the traffic-signaling device.

According to a further aspect of the system or any other aspect, the at least one device external to the traffic controller unit includes a mobile device located on a pedestrian or a vehicle and configured to receive the SPAT messages from the traffic controller unit.

According to a further aspect of the system or any other aspect, the traffic-related triggering event includes (i) a change to a present or future state of a light at the traffic-signaling device or (ii) exceeding a predetermined signal timer at the traffic-signaling device, wherein the predetermined signal timer corresponds to a particular traffic light state.

According to a further aspect of the system or any other aspect, the information associated with the traffic-related triggering event includes travel-related information messages received from a mobile device located on a vehicle or an individual.

According to a further aspect of the system or any other aspect, the travel-related information messages include data relating to a past or current traffic-related activity of the vehicle, and wherein the data includes vehicle position, speed, heading, acceleration, vehicle size, vehicle mass, steering wheel angle, braking data, and associated time stamps.

According to a further aspect of the system or any other aspect, the travel-related information messages include data relating to a past or current traffic-related activity of the individual, and wherein the data includes position, speed, heading, acceleration, and associated time stamps.

According to a further aspect of the system or any other aspect, the traffic controller unit is configured to transmit the SPAT message using radio frequency (RF) signals and cellular signals.

According to one aspect, a non-transitory computer-readable medium having program code that is stored thereon, the program code executable by one or more processing devices for performing operations including: receiving information associated with a traffic-related triggering event; determining that the information indicates an occurrence of the traffic-related triggering event; and causing a traffic controller to transmit signal, phase, and timing (SPAT) messages of a traffic-signaling device to at least one device external to the traffic-signaling device in response to determining the occurrence of the traffic-related triggering event.

According to a further aspect of the non-transitory computer-readable medium or any other aspect, the operation of causing the traffic controller to transmit the SPAT messages of the traffic-signaling device to the at least one device external to the traffic controller includes: transmitting the SPAT messages to a cloud-based server, wherein the cloud-based server is configured to communicate with one or more mobile devices located on a pedestrian or a vehicle.

According to a further aspect of the non-transitory computer-readable medium or any other aspect, the traffic-related triggering event includes (i) a change to a present or future state of a light at the traffic-signaling device, (ii) exceeding a predetermined signal timer at the traffic-signaling device, (iii) detection of an approach of a pedestrian or a vehicle at the traffic-signaling device, or any combination thereof.

These and other aspects, features, and benefits of the claimed embodiment(s) will become apparent from the following detailed written description of the preferred embodiments and aspects taken in conjunction with the following drawings, although variations and modifications thereto may be effected without departing from the spirit and scope of the novel concepts of the disclosure.

Definitions

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

1. Basic Safety Message (BSM): In one embodiment, a basic safety message comprises data relating to a past and current status of a particular vehicle (or pedestrian). For example, a BSM may include data such as vehicle position, speed, heading, acceleration, vehicle size, vehicle mass, steering wheel angle, recent braking data, a time stamp, etc. In the system discussed herein, BSMs may be periodically transmitted from communication devices at vehicles or pedestrians, and the transmissions may be cellular, RF, Wi-Fi, and/or Bluetooth transmissions to a cellular network, an RF receiver, or an on-board unit at another vehicle or pedestrian.

2. Personal Safety Message (PSM): In one embodiment, a personal safety message generally relates to past and current traffic-related activity of an individual (e.g., a pedestrian) within the system. For example, a PSM may include data such as position, speed, heading, acceleration, and a time stamp corresponding to the individual's travel-related activity within the system, and this data may be transmitted periodically via the individual's mobile phone. In some embodiments, PSMs may be "reduced" BSMs, where information specific to automobiles (that is typically included in a BSM) is not included in a transmitted PSM. In various embodiments, PSMs allow for pedestrian activity to be considered along with vehicle activity when analyzing traffic scenarios in a smart-city environment.

3. Signal, Phase, and Timing (SPAT or SPaT): SPAT data generally includes a present (or future) status of a traffic light controller unit at an intersection in a roadway. For example, SPAT data includes at least a current light state or phase (e.g., green, red, yellow, etc.) for each light controlled by the traffic light controller (and each lane if appropriate), and furthermore a timer associated with each light state. In various embodiments, the timer may be a countdown timer indicating when the light state will change, or the timer may be a running timer indicating how long the light state has been active.

4. MAP Data: In various embodiments, a MAP message, or MAP data, generally includes a representation of a particular intersection geometry. For example, MAP data may include data relating to how many roads converge on an intersection, the number of lanes per road, lane types (e.g., thru-lane, turning lane, etc.), and geographic data (e.g., longitude/latitude coordinates, reference distances, etc.) outlining this information (and more) for providing a "blueprint" of the intersection geometry.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
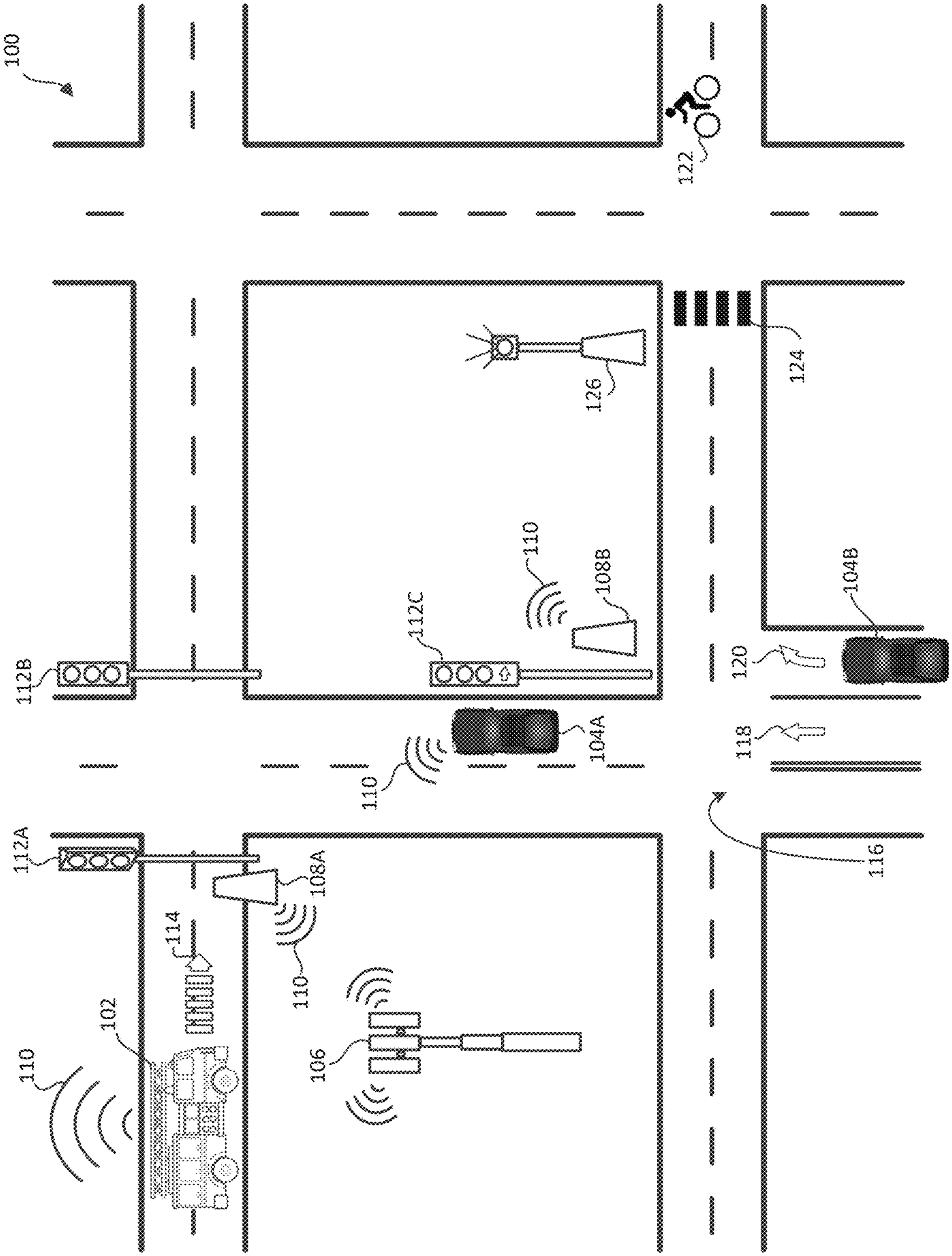
FIG. 1 illustrates an exemplary operational environment of the present system, according to one aspect of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, and according to one embodiment, aspects of the present disclosure relate generally to the management of traffic controllers and traffic lights/signal based on cellular and/or radio frequency data transmitted to and received from mobile devices, automobiles, or other communication hardware available to drivers and pedestrians. In one embodiment, the system, methods, and devices discussed in the present disclosure aim to improve outdated and conventional traffic controllers by integrating hardware and software solutions that allow for traffic related data to be shared between the traffic controllers, drivers, and pedestrians to promote a safer, more efficient, and overall enhanced traffic environment.

Consider, for example, a scenario where an emergency response vehicle (or the like) is travelling on a particular route and is approaching an intersection. Conventional traffic control systems (controller boxes located at every intersection that control the state of traffic lights) are not equipped to accommodate the emergency response vehicle in the event that it encounters a red traffic light, or even a generally busy and congested intersection. In this scenario, the emergency response vehicle relies solely on the sounding sirens and lights to alert drivers about the incoming emergency response vehicle, which is not always effective. As is well known by anyone who has operated a motor vehicle, it is not always easy to determine how far away an approaching emergency response vehicle is, what direction it is approaching from, and in some instances the sirens and lights may not be noticeable until it is too late. These types of scenarios often cause confusion amongst drivers and are generally unsafe for all parties involved. Embodiments of the present systems, methods, and devices allow for traffic controllers to communicate with motor vehicles (e.g., emergency response vehicles, civilian operated motor vehicles, etc.) and pedestrians in order to manipulate traffic to allow for particular vehicles to pass through certain areas without complications.

Another example of applications for embodiments of the present disclosure include the ability for the present systems, methods, and devices to provide drivers with sensory ques (e.g., visual and audible) regarding upcoming traffic states via the drivers' mobile devices or displays integrated with the drivers' automobiles (e.g., navigation systems, dashboard touch screens, etc.). In one embodiment, a driver may be approaching a particular intersection or stop sign that is nearby but still not visible (e.g., the driver's line of sight is obstructed by a natural landmark, building, etc.). In this embodiment, the automobile's audio/visual system, or the mobile computing device of the driver, may present the driver with visual and/or audio ques about the upcoming traffic state. For example, if the driver was approaching a stop sign, the mobile device speaker or automobile sound system may audibly produce an audio que such as "Stop sign ahead," and a display may present the user with a visual indication of where the stop sign is in relation to the vehicle, how many drivers are currently waiting at the stop sign, etc. If the driver was approaching an intersection, the driver may be presented with a visual indication that the light is currently green, yellow, or red, prior to the driver's ability to see the physical light structure. This visual indication may be presented in various ways, such as replicating the traffic light layout on a mobile device screen, dashboard touchscreen, or hologram display integrated within the windshield. For example, the visual indication may resemble two arrows, a straight arrow and a left-curved arrow. In this example, the straight arrow may be green, indicating that the current state of the traffic light allows for drivers to continue through the light without stopping. Continuing with this example, the left-curved arrow may be red, indicating that the current state of the traffic light requires drivers intending to turn left to wait for the light state to switch to green. According to various embodiments, the arrows may be represented as two dimensional icons on a flat display such as an LCD or LED screen, or the arrows may be presented as a semi-transparent hologram or projection within a glass pane.

In some embodiments, the system may track the timing of certain traffic lights, thereby allowing the system to present drivers with information such as when the light will turn from one state to another. Furthermore, the system may present these ques, alerts, and notifications audibly. In one embodiment, a driver may be stopped at a red light and not paying attention to the status of the traffic light (e.g., checking his/her emails on his/her mobile device). In this scenario, the system may present the user with an audible que, such as sounding "Get ready for green," which notifies the driver that the light will soon change from red to green. This allows for the driver to be prepared to begin moving his/her vehicle promptly, which may reduce overall traffic due to the decrease of propagated wait times that result from distracted drivers and delayed action at green lights. To do so, however, the present system should have knowledge of the impending change to "green" of the relevant traffic light.

In some embodiments, the functionality of the present systems, methods, and devices, may be implemented in or promote the development of autonomous driving vehicles. As will be described in further detail herein, the data transmitted and received between traffic controlling systems and the mobile devices of the vehicle drivers (or the vehicles themselves) may provide the traffic data for coordinating a safe environment for a hands-off driving ecosystem.

According to various aspects of the present disclosure, an exemplary environment where the present systems may operate includes components such as radio frequency (RF) transmitters and receivers, cellular data transmitters and receivers (e.g., mobile phones or standalone components), traffic hardware (e.g., stoplights, beacons, curve warning, stop sign approaching, etc.) and their corresponding HW/SW controller systems, and a wireless communications network. In one embodiment, implementations of the systems and methods include a back-and-forth communication of data between the driver/vehicle and the traffic controllers, the data including information such as GPS, intersection geometry, identification data, priority data (e.g., emergency response vehicle), etc., and this data is used to further coordinate safer traffic ecosystems and also provide drivers with enhanced insight into traffic states and conditions.

In some embodiments, a cloud-based server may also be included in the system. In one embodiment, the cloud-based server may allow for remote computing of particular traffic-related messages, as well as facilitate communication between system components.

In various embodiments, novel aspects of the disclosed systems, methods, and devices may include (but are not limited to) a combination of cellular and RF signals transmitted from an automobile or user's mobile computing device to a traffic control system for managing current or future traffic states; RF and/or cellular data communication from the traffic control system to a mobile computing device or receiver including data such as current status and future status of the particular intersection controlled by the traffic control system, which may be used to provide users with alerts such as "Get ready for green" on their mobile computing devices; and allowing other traffic light devices, such as school beacons, to transmit the status of those devices to drivers for alerting the drivers about approaching school zones, occupied cross walks, etc.

Referring now to the drawings, FIG. 1 illustrates an exemplary operational environment 100 of the present system, according to one aspect of the present disclosure. As depicted in the present embodiment, the operational environment 100 is a roadway including various motor vehicles, cyclists, and in some embodiments even pedestrians, etc. According to various aspects of the present disclosure, the operational environment 100 includes various networked components including (but not limited to) mobile phones, various signal transmitters and receivers, cellular modems, sensors including GPS, velocity, Wi-Fi, and Bluetooth sensors, and processors for analyzing data, readings, and requests from each of these various networked components. In one embodiment, the illustrated network of hardware, computing devices, and components allows for various improvements in traffic management such as allowing for a user to change traffic light states on-demand (or in the future), and allowing for individuals to receive traffic alerts unique to their position and direction of travel, where the alerts provide the individuals with information for allowing them to make better traffic-related decisions.

As depicted in the present embodiment, the operational environment 100 includes motor vehicles such as a fire truck 102 and cars 104A and 104B. According to various aspects of the present disclosure, at least one network component for allowing devices in the system to communicate is a cellular network 106, or cellular network backbone. In a particular embodiment, the cellular network 106 includes the infrastructure (e.g., cell towers, receivers, transmitters, repeaters, modems, etc., for supporting broadband, 3G, 4G, 5G, LTE, etc.) for allowing computing devices, processors, and sensors to send information across a cellular medium. In one embodiment, the cellular network 106 is operable to transmit and receive cellular data between the motor vehicles including the fire truck 102 and the cars 104A-B, as well as between a plurality of traffic intersection controller units 108 (e.g., intersection hardware cabinets). As shown in the present embodiment, the fire truck 102, each of the cars 104A-B, and each of the plurality of traffic intersection controller units 108 includes emanating signal waves 110 indicating active communication between these components and the cellular network 106.

Continuing with FIG. 1, the plurality of traffic intersection controller units 108 are generally enclosed structures or cabinets including various hardware components for controlling the states of a plurality of traffic lights, or traffic-signaling devices, which are indicated throughout the operational environment 100 as 112A, 112B, and 112C. According to various aspects of the present disclosure, the traffic intersection controller units 108 are typically close in physical proximity to the traffic lights 112, and as will be described in greater detail herein, the traffic intersection controller units 108 may initiate modifications to the current or future states of traffic lights in response to receiving particular signals from the automobiles in the operational environment 100, and the traffic intersection controller units 108 may furthermore transmit information relating to the states of the traffic lights 112 to be received at the vehicles 102, 104A, and 104B (for example).

In a particular embodiment, the operational environment 100 supports a scenario (as depicted in the present embodiment) where an emergency response vehicle, such as the fire truck 102, is approaching various traffic lights (112A and 112B). Typically, emergency response vehicles do not stop at traffic intersections but instead will approach a traffic intersection with engaged visible and audible sirens, slowly move through the traffic intersection creating chaos while cars abruptly stop and maneuver out of the direction of the emergency response vehicle, and then speed away when successfully through the traffic intersection. The present disclosure presents a solution to this problem via a dual-transmission process, where an emergency response vehicle such as the fire truck 102 simultaneously transmits a cellular signal (e.g., the signal 110 at the fire truck 102) and a radio frequency ("RF") signal 114 directed to the traffic intersection controller unit 108A, where the cellular signal 110 and the RF signal 114 are both encoded with a request to change the traffic light state. According to various aspects of the present disclosure, the system may be configured to operate such that in response to receiving a first signal of the simultaneously transmitted RF and cellular signals, the traffic intersection controller unit 108 may initiate an immediate (or future) change to the current states of the traffic lights 112A and 112B. As such, implementing embodiments of the current system allows for an emergency response vehicle to request a green light upon arrival at the traffic intersection, while intersecting and/or opposing traffic may be held at a red light state, thus preventing the dangerous and confusing scenarios discussed above.

In particular embodiments, the dual-transmission process provides a robust system that allows for efficient and reliable communication between the fire truck 102 and the traffic intersection controller unit 108. For example, in a scenario where the fire truck 102 is travelling on a straight road and is approaching a traffic intersection, both the RF signal and the cellular signal of the dual-transmission should be received at the traffic intersection controller unit 108 at about the same time (although the RF signal should be received just before the cellular signal due to latency introduced by the cellular network), thus allowing for the fire truck 102 to request a green light upon arrival. In a separate scenario where the fire truck 102 is traveling on a winding road, or traveling through an area with mountainous terrain or tall buildings, the RF signal included in the dual-transmission may not be received by the traffic intersection controller unit 108 due to interference or deflection of the RF signal (e.g., from deflecting off a building or the like). However, barring a network failure, the cellular signal is received via a reliable LTE signal (or the like), thus allowing for the fire truck 102 to communicate the request for a traffic light state change.

Still referring to FIG. 1, the system may provide users (e.g., automobile drivers, pedestrians, cyclists, etc.) with traffic-related alerts at their mobile devices or on-board navigation units, the alerts including traffic information specific to their locations, directions of travel, etc. For example, consider the intersection 116 depicted in the present embodiment. In one embodiment, the intersection 116 includes at least a thru-lane 118 and a turning lane 120, and the traffic intersection controller unit 108C and traffic light 112C control the traffic flow (of car 104B) through the intersection 116. According to various aspects of the present disclosure, a user operating the car 104B may possess a mobile computing device (such as a smart phone), or the car 104B may include an on-board communication device, such that the user may be presented with traffic related information via a digital display. In certain embodiments, and assuming the user possesses a smart phone, as the user operating the car 104B approaches the intersection 116, the user's smart phone may display an alert including a pattern of the available lanes (e.g., the thru-lane and the turning lane), the available lanes may be color-coded representative of their current state (e.g., green, red, yellow, etc.), and the alert may include timers or time indications for when the current traffic light states will change. In various embodiments, the system generates this alert (and other similar alerts) via comparing data including, but not limited to, a basic safety message (BSM) the GPS location and velocity of the car 104C, MAP (intersection geometry) data corresponding to the intersection 116, and the signal, phase, and timing (SPAT) data corresponding to the traffic intersection controller unit 108C and traffic lights 112C. In certain embodiments, these alerts may be accompanied by vocal/audible announcements of the alerts, for example, announcing "Get ready for green!" in response to the SPAT data indicating near expiration of a state timer.

According to various aspects of the present disclosure, the present system not only improves driver safety, but also improves the safety of pedestrians, bikers, etc. For example, and continuing with FIG. 1, the exemplary environment 100 further includes a cyclist 122, a crosswalk 124, and a beacon 126. As will be discussed in further detail below in association with FIG. 2, pedestrian users may connect to the networked components via their smart phones to receive traffic related alerts and data. For example, the cyclist 122 may receive an alert notifying the cyclist 122 about the car 104B and its intent to turn right, thus allowing the cyclist to prepare for and anticipate the car's behavior. Furthermore, the driver of the car 104B may receive a similar alert notifying him/her of the presence of the cyclist 122. In a particular embodiment, a pedestrian may enter the crosswalk 124, and the beacon 126 may begin to flash a light, make a noise, etc., thus signaling that the crosswalk 124 is occupied. In some embodiments, the beacon 126 is equipped with similar equipment as the traffic intersection controller units 108, and thus a pedestrian entering the crosswalk 124 may be a trigger event for initiating transmission of data such as SPAT and/or MAP data to nearby or approaching vehicles. In certain embodiments, the SPAT and/or MAP data transmitted by the beacon 126 may be received at the car 104B, and in response the driver of the car 104B may be presented (via his/her smart phone), an alert that the crosswalk 124 is occupied, an alert to slow down or stop at a certain distance from the crosswalk, etc.

Figure 2:
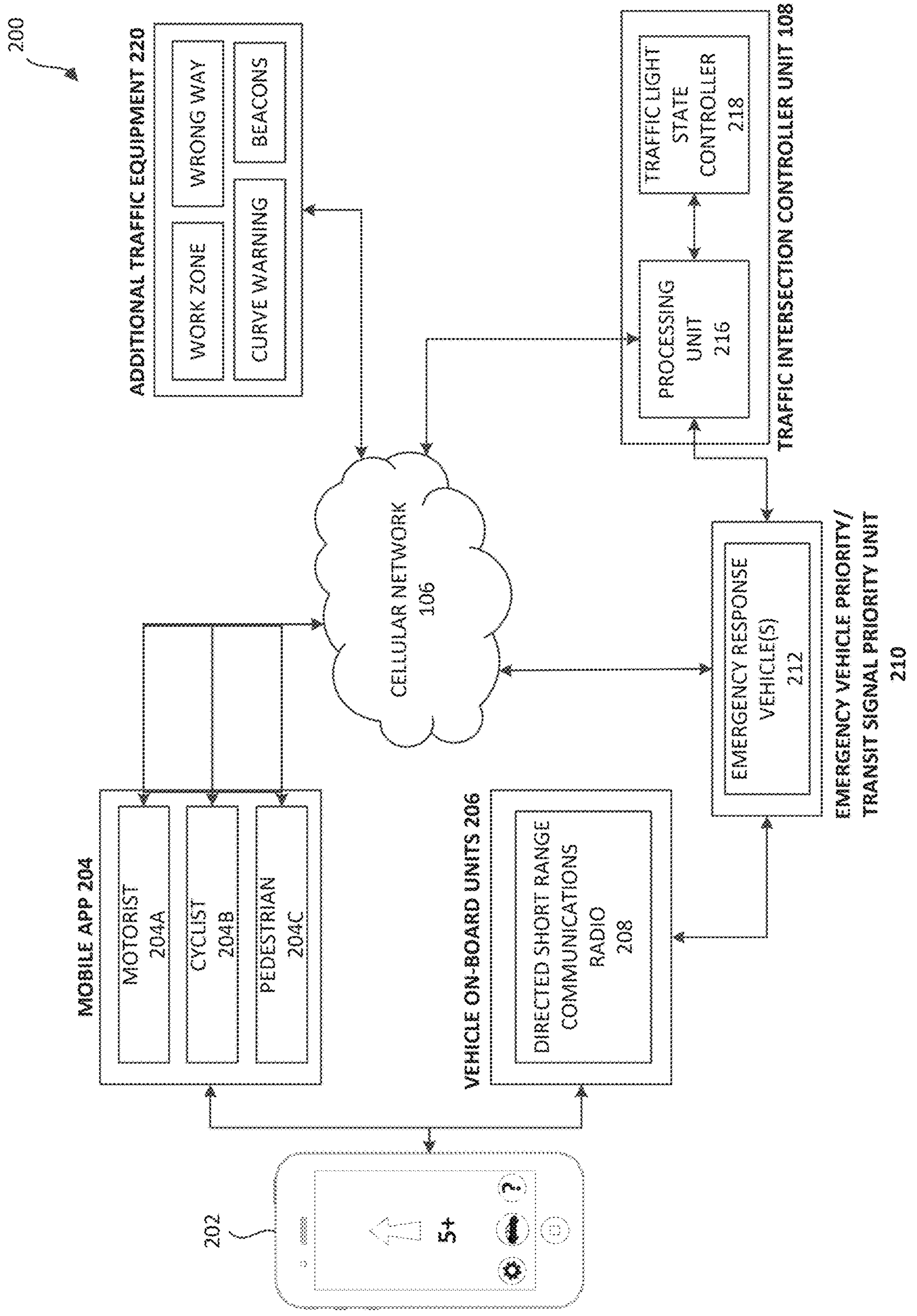
FIG. 2 illustrates an exemplary system architecture, according to one aspect of the present disclosure.

Turning now to FIG. 2, an exemplary system architecture 200 is depicted, according to one aspect of the present disclosure. In various embodiments, the exemplary system architecture 200 depicted in FIG. 2 illustrates the components of the system and how the components are connected and/or networked. As shown in the present embodiment, the exemplary system architecture 200 includes at least one or more mobile computing devices 202, where the mobile computing devices 202 allow for instances of a mobile application 204 (e.g., instances at mobile devices belonging to motorists 204A, cyclists 204B, pedestrians 204C, etc.) to communicate with other devices and components in the network, and the mobile computing devices 202 also enable short range communication via vehicle on-board units ("OBUs") 206. According to various aspects of the present disclosure, OBUs 206 include directed short range communication ("DSRC") units 208, which may be operatively connected to vehicle driver's smartphone via Bluetooth, Wi-Fi, or the like, and the DSRC units 208 may communicate with nearby vehicles or pedestrians (via cellular, Bluetooth, Wi-Fi, etc.). The exemplary system architecture 200 furthermore includes emergency vehicle preemption and transit signal priority units 210 ("EVP/TSP"), where EVP/TSP units 210 may be included at emergency response vehicles 212, such as the fire truck 102, police vehicles, etc.

According to various aspects of the present disclosure, various types of data are transmitted and received between the components of the disclosed system, those data types including Basic Safety Messages (BSM), Personal Safety Messages (PSM), Signal Phase and Timing Messages (SPAT), Intersection Geometry Messages (MAP), and others. BSM and PSM type messages are standard message types including data such as vehicle speed, heading, acceleration, vehicle size, position data, etc. In various embodiments, these messages may be generated by the user's mobile computing device and may be transmitted to various traffic controllers (or mobile computing devices associated with other users) via cellular or RF signals, thereby allowing for the controlling systems at the traffic hardware to be aware of the vehicle status in near real-time. In one embodiment, the SPAT and MAP data includes information regarding the status of traffic lights as well as the layout of the intersections they control. For example, MAP data includes information outlining the layout of intersections, such as where the stop lights are positioned, how many lanes pass through the intersection, where particular lines are located on the road pavement, where turning lanes are located, etc. In various embodiments, SPAT data includes information relating to the status of each particular light. For example, receiving a SPAT message allows for the receiver to determine the current status of a particular light (e.g., green, red, yellow, etc.) and the amount of time left until the light changes state. In certain embodiments, the SPAT data and MAP data may allow for a receiver of the data to determine not only the status of an upcoming traffic obstacle, but also how to best respond to and navigate the traffic obstacle.

According to various aspects of the present disclosure, each motorist 204A, cyclist 204B, pedestrian 204C, OBU 206, and EVP/TSP unit 210 may periodically transmit or emanate their respective BSM/PSMs via a cellular device, RF transmitter, Wi-Fi, Bluetooth, etc., to the other network components, and in response receive BSM/PSM data, SPAT data, MAP data etc.

In one embodiment, each of the mobile application instances 204, vehicle OBUs 206, and EVP/TSP units 210, may communicate over a cellular network 106 (or via direct RF transmissions) with one or more traffic intersection controller units 108. According to various aspects of the present disclosure, each of the one or more traffic intersection controller units 108 may include at least a processing unit 216 and an intersection/traffic light state controller 218. In various embodiments, the at least one processing unit 216 may be a roadside processing unit including integrated cellular, GPS, and RF (e.g., 900 MHz) components, and the at least one processing unit 216 may be powered via remotely switching between NEMA 5-15 power outlets inside the traffic intersection controller unit (although the unit 216 may also include one or more battery back-ups).

In a particular embodiment, the traffic light state controller 218 may include hardware and/or software for controlling the present and future state of the traffic lights 112 (discussed in association with FIG. 1). For example, the traffic lights 112 may operate according to a state machine, or the like, where the state machine jumps between various states (e.g., green, red, and yellow lights) in response to various triggers or events. In various embodiments, an example trigger or event may include an expired timer, such as a timer for monitoring how long a particular traffic light has been green. In response to the timer expiring (or reaching a certain time from expiry) the state machine may switch from a green light state to a yellow light state. This timer may continue for switching from the yellow light state to the red light state, or a new timer may be initiated. In certain embodiments, this traffic state data may be packaged and transmitted throughout the system as signal, phase, and timing data.

In particular embodiments, the cellular network may include one or more cloud-based/remote servers for processing data received from the mobile applications 204, the OBUs 206, and the EVP/TSP units 210. According to various aspects of the present disclosure, processing the data at the cloud-based/remote servers reduces the workload at the mobile computing devices, and thus reduces the amount of time required to generate a traffic alert.

Continuing with FIG. 2, the exemplary system architecture 200 includes additional traffic equipment 220 such as, but not limited to, beacons (e.g., the beacon 126), stop signs, curve warnings, work zones, wrong way signs, etc. According to various aspects of the present disclosure, each unit of additional traffic equipment may include a cellular modem, RF sensor, or similar device for transmitting and receiving traffic related data throughout the system. For example, in response to receiving a BSM transmitted from a motorist to a nearby crosswalk beacon (for example), a processing unit at the crosswalk beacon may respond to the BSM by returning a transmission of MAP and SPAT data, where the motorist's mobile device or OBU may process the received MAP and SPAT data for presenting alerts notifying the motorist that a pedestrian currently occupies the crosswalk, that the motorist is currently exceeding the speed limit near the crosswalk, that there is a stop sign before the crosswalk, etc.

According to various aspects of the present disclosure, and in response to the mobile application 204 receiving SPAT and MAP data from nearby traffic intersection controller units 108 or beacons 126, the mobile application 204 may use this data to present to the user a visual indication of the present state of the traffic lights (e.g., displaying shaped and/or colored arrows on the mobile device 202).

According to various aspects of the present disclosure, the system architecture 200 includes exemplary components for both priority and preemption capabilities for emergency response vehicles 212, as well as general traffic alerts for regular civilian drivers and pedestrians (e.g., 204A-204C). In one embodiment, the priority and preemption specific components include the EVP/TSP 210 and/or mobile application instances 204 with dedicated short range radio communication (DSRC) capabilities. According to one embodiment, the system allows for on board units (OBUs) associated with the vehicles (e.g., emergency response vehicles 212) to transmit RF signals to receivers integrated with the processing unit 216 at the traffic controller units 108 for communicating BSMs as well as priority and preemption indicators. In certain embodiments, priority and preemption indicators may be transmitted by devices other than the OBUs, such as a driver's mobile phone. According to various aspects of the present disclosure, the priority and preemption indicators are included in BSMs or PSMs as data or data packets, such as data in a data field included in a message header, which can be read and interpreted by a receiver (e.g., a traffic controller system). For example, the BSMs transmitted from the fire truck 102 of FIG. 1 may indicate within the BSMs that the fire truck 102 is a type of emergency response vehicle, which may trigger the traffic intersection controller unit 108 to provide the fire truck 102 with a green light when approaching the intersection (e.g., via the traffic light 112A). In another example, the BSMs transmitted from a delivery vehicle or standard passenger vehicle may indicate the vehicle type, which may allow for the vehicle to receive certain priority benefits at traffic intersections such as receiving green lights during low traffic hours (e.g., early in the morning or late at night) or receiving green lights when no opposing traffic is nearby.

In particular embodiments, the OBUs 206 are proprietary communication and field I/O controllers operable to transmit cellular, RF, Wi-Fi, GPS, and other signals to systems such as the traffic intersection controller unit 108, and also the other OBUs 206 at nearby vehicles, for example. These signals are received by DSRC radios 208 at nearby vehicles, or perceived and processed by the processing unit 216 at the traffic intersection controller unit 108. In one embodiment, the processing unit 216 is a proprietary hardware add-on which may be installed to operate in parallel with the traffic light state controller 218 at the traffic intersection controller unit 108. In various embodiments, the processing unit 216 (which may be a server shelf, or the like) is configured to integrate with the preexisting traffic controller systems and further allow for the system components described herein to communicate with the processing unit 216 at particular traffic intersection controller units 108, and furthermore make informed decisions based on the communicated data.

In some embodiments, and during the dual-transmission process, the processing unit 216 at the traffic intersection controller unit 108 may be configured to process either the RF signal or the cellular signal based on signal preference or the order of which each signal is received. In other embodiments, the processing unit 216 may be configured to process both signals for purposes such as security, which ensures a single signal type is not being transmitted by a malicious or untrusted party.

In certain embodiments, the SPAT message allows for the mobile applications 204 operating in conjunction with the mobile computing devices 202 to present an alert to the user that a traffic light will change state in a particular amount of time. For example, the mobile application may be displaying a straight and green-colored arrow indicating that the current status of the light allows for the driver to continue driving through the intersection, however, if the light is scheduled to change from green to yellow in a predetermined amount of time (e.g., 5 seconds), the predetermined amount of time may be displayed in conjunction with the green arrow (e.g., below or adjacent to the arrow). In other embodiments, the timing data included in the SPAT message may allow for the driver's mobile device or built-in automobile sound system to produce an audible alert, such as "Get ready for green," which alerts the driver that a red light will change to green in a predetermined amount of time that is generally short in length (e.g., a few seconds).

Figure 3:
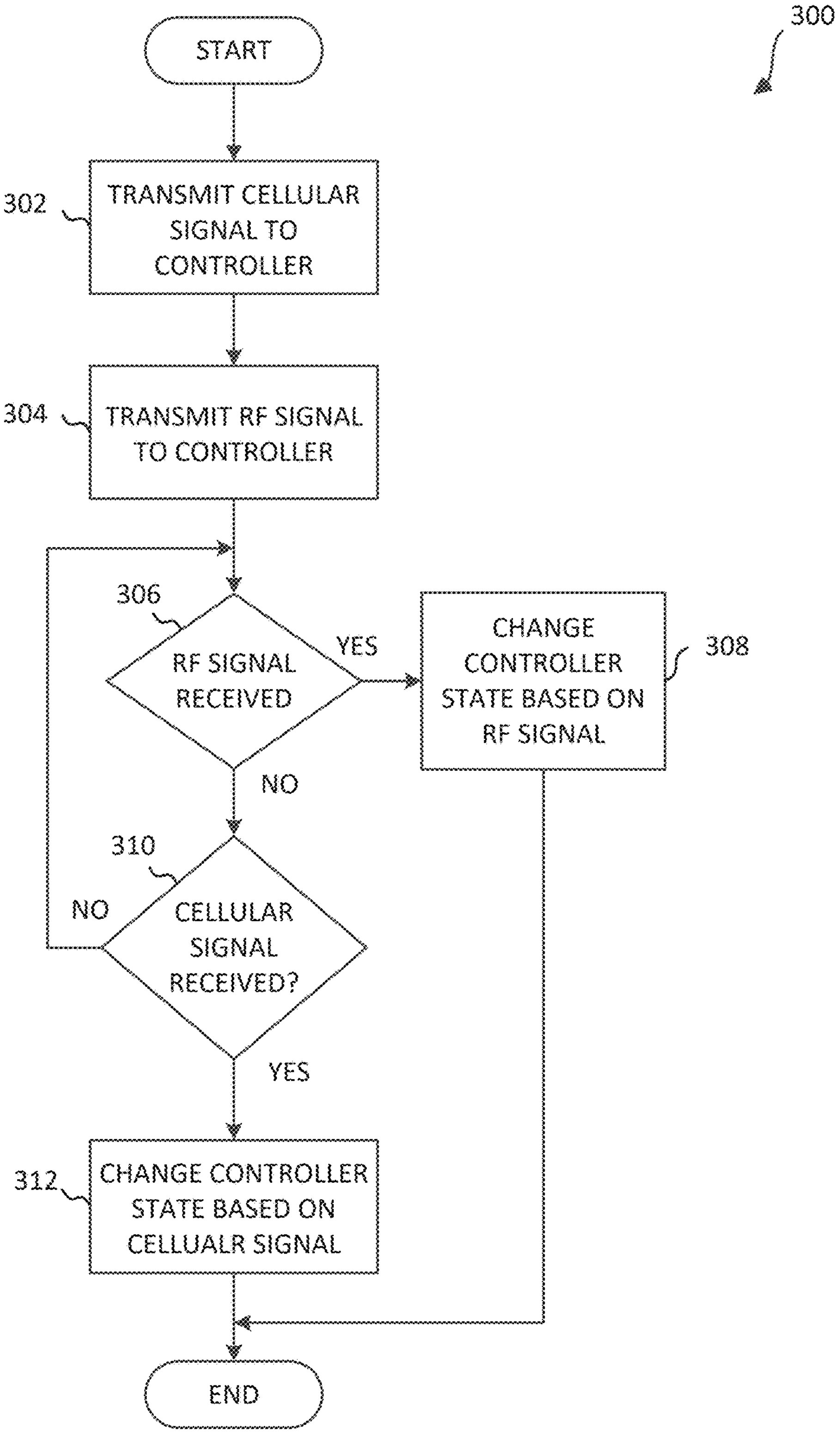
FIG. 3 is a flowchart illustrating an exemplary dual-transmission process, according to one aspect of the present disclosure.

In a particular embodiment, FIG. 3 is a flowchart illustrating an exemplary dual-transmission process 300, according to one aspect of the present disclosure. In one embodiment, this process allows for the traffic intersection controller unit 108 to receive at least the location and speed of an automobile or pedestrian (based on a BSM or PSM, respectively), and to further change the state of the controller unit 108 based on the received data. In various embodiments, the state of the controller unit 108 may be changed for various reasons. For example, the state of the controller may be changed in situations such as when an emergency response vehicle is approaching an intersection and a green light is required to ensure that the emergency vehicle passes through the intersection with minimal delay. Another example where the state of the controller may be changed is to provide certain vehicles, such as postage or package delivery vehicles, with green lights when there is no opposing traffic. Changing the state of a traffic controller to accommodate delivery vehicles allows for the vehicles to complete routes in shorter amounts of time, use less fuel, and/or deliver more packages. In another example, if the traffic controller detects a substantial amount of traffic moving from North to South through an intersection, the controller may dynamically change the East to West traffic light state or schedule to reduce the frequency of light changes, thereby preventing unnecessary stops in the North to South traffic. According to one aspect of the present disclosure, the process begins at step 302, where the mobile computing device corresponding to the automobile or pedestrian transmits a cellular signal to the traffic controller. In various embodiments, this transmission is accomplished via a cellular tower and the supporting cellular backbone infrastructure (e.g., the cellular network 106. In a particular embodiment, the cellular signal includes the BSM and/or PSM data relating to the particular automobile or pedestrian, and provides the traffic controller (e.g., the traffic intersection controller unit 108) with information such as position, speed, etc.

At step 304, the mobile computing device transmits an RF signal to the traffic controller. In some embodiments, the RF signal may be transmitted before, after, or simultaneously to the cellular signal, and the RF signal may include the same BSM or PSM data relating to the automobile or pedestrian. According to various aspects of the present disclosure, transmitting an RF signal in addition to the cellular signal provides assurance that the signal will be retrieved by the controller. For example, in one scenario, the cellular network may be inoperable. In that scenario, the RF signal may still be received by the traffic controller. In other embodiments, the RF signal may encounter interference or the signal may be deflected. In those embodiments, the cellular signal may still be received. Transmitting both cellular and RF signals to the traffic controllers enhances the reliability and robustness of the system and allows for the system to operate with an overall improved efficiency.

Continuing with FIG. 3, the process continues to step 406 where the traffic controller determines if the RF signal has been received. Referring back to steps 302 and 304 the cellular signal and RF signal are both transmitted to the traffic controller either simultaneously or in sequence. According to one aspect of the present disclosure, at step 306, the traffic controller is operable to receive at least one of the transmitted signals. If, at step 306, the RF signal is received, than the process proceeds to step 408 where the traffic controller changes the controller state based on the RF signal data. For example, if the received RF signal was transmitted from an emergency response vehicle and the signal (e.g., BSM) included a high priority indication, the traffic controller may alter the current state of the traffic lights to either stop traffic or control the flow of traffic to allow for the emergency response vehicle to pass through the intersection without complications.

If at step 306 the RF signal was not received, the process continues to step 310 where the traffic controller determines if the cellular signal was received. If the cellular signal was received at step 310, the process may proceed to step 312 where the traffic controller changes the controller state based on the received cellular data. Similarly to step 408, the data received by the traffic controller may include a BSM from an emergency response vehicle. In various embodiments, the data included in the BSM may require a state change of the traffic controller for allowing the emergency response vehicle to freely pass through the traffic intersection.

In summary, the process 300 includes transmitting to a traffic controller both a cellular and RF signal including substantially the same information regarding an automobile or pedestrian, and then changing the state of the traffic controller based on the first received message (if appropriate). In some embodiments, the process 300 may include additional steps, such as before the steps 308 and 312, where the traffic controller may process at least a portion of the received signal(s) for determining that the validity of the signal(s), the priority of the signal(s), or other aspects of the signal(s). According to various aspects of the present disclosure, both the RF and cellular signals are assembled data packets including an identification number (or the like) associated with the transmitting vehicle or corresponding device, the status of the vehicle indicators, emergency lights, door status, etc. In some embodiments, a cyclic redundancy check may be implemented to ensure data integrity of the received signals and the data included in the signals may be encrypted prior to transmission.

Figure 4:
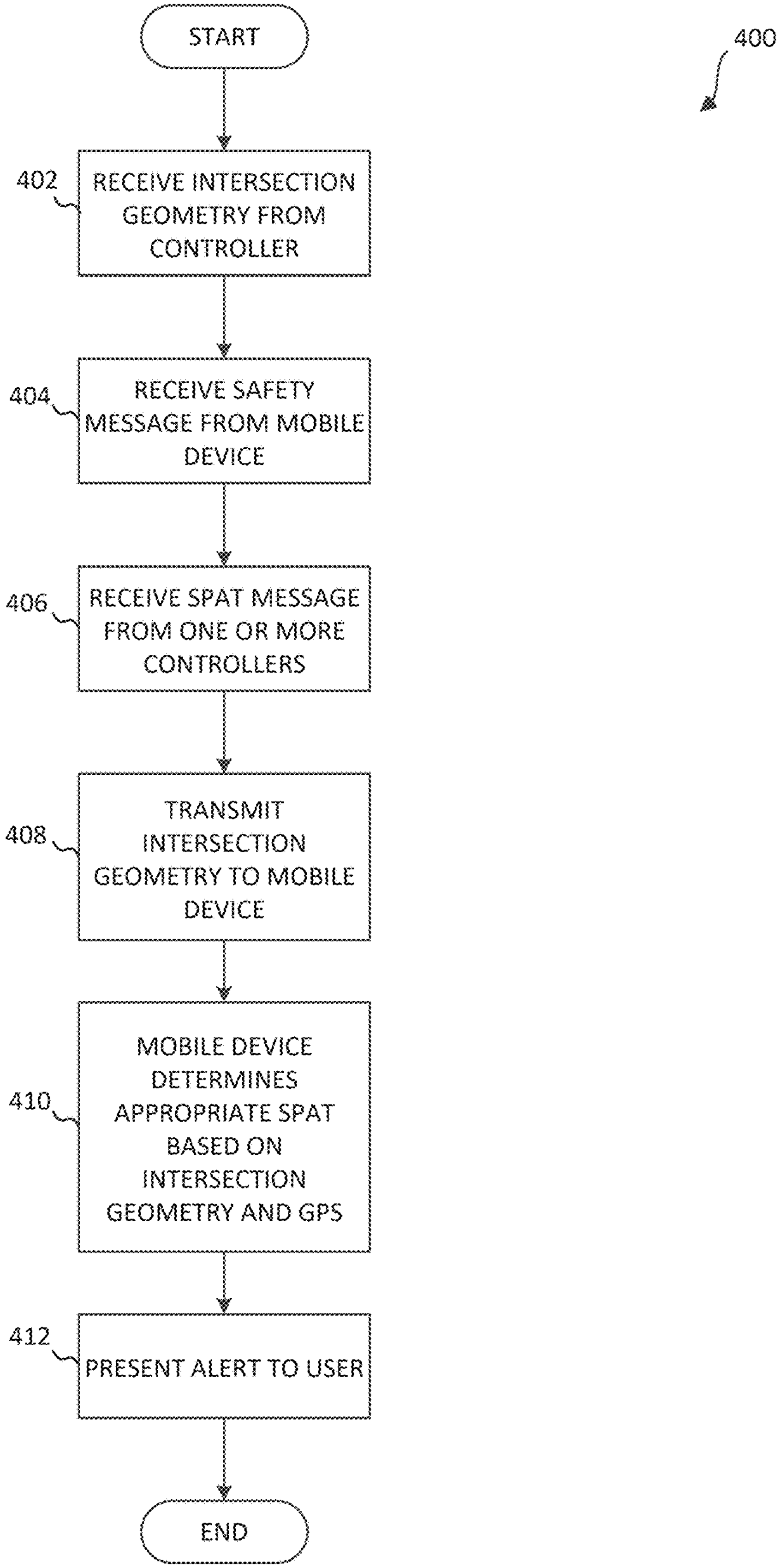
FIG. 4 is a flowchart illustrating an alert decision process, according to one aspect of the present disclosure.

Looking now at FIG. 4, a flowchart illustrating an alert decision process 400 is shown, according to one aspect of the present disclosure. In one embodiment, the process 400 generally includes presenting an alert to a user (e.g., a driver or pedestrian) based on data from MAP, SPAT, BSM, PSM, etc., type messages. In various embodiments, the alert is presented to the user via his/her mobile computing device and may inform the user about the status of a traffic light, how fast to drive in order to avoid stopping at the traffic light, the proximity of other nearby drivers or pedestrians, etc. In some embodiments, a cloud-based server included in the cellular network 106 may process at least a portion of these messages and act as an intermediary when determining if to transmit particular messages to either a traffic controller or mobile computing device. According to one aspect of the present disclosure, the process 400 begins at step 402, where the cloud-based server within the cellular network 106 receives intersection geometry (e.g., MAP message) corresponding to one or more traffic intersections. In some embodiments, MAP messages are received periodically from the traffic controllers, or the mobile computing devices may request MAP messages from the traffic controllers as necessary, such as during an initial configuration or system updates. In particular embodiments, the MAP messages may be manipulated, customized, or extended to include additional data for allowing a mobile computing device or built-in vehicle display to present a visual representation of the traffic signals. In some embodiments, the MAP message extensions may include parameters such as traffic light types (e.g., five signal section head) and lane counts. In various embodiments, extending the MAP message to include the traffic light types and lane counts allows for the mobile application, or built-in vehicle display, to illustrate the intersection and how the current state of the traffic lights corresponds to the lanes (e.g., left turning lanes are red but through lanes are green). In particular embodiments, the MAP messages may also be extended to include parameters which allow the receiving devices to present alerts such as "Get ready for green" and "Red light". These parameters may include data indicating when certain lights will change states, or the order in which certain lights change states (e.g., turning lanes are always red while through lanes are green).

At step 404, according to one aspect of the present disclosure, BSMs are transmitted by the automobiles or the mobile computing devices associated with the automobiles to the cloud-based server. According to various aspects of the present disclosure, PSMs (from pedestrians or bikers) may also be sent to the cloud-based server. In particular embodiments, receiving BSMs and/or PSMs allows for the cloud-based server to determine at least the location, speed, and direction of the automobiles and/or pedestrians for further transmitting data which may be used to service the users with relevant traffic alerts.

At step 406, one or more SPAT messages are transmitted to the cloud-based server from the one or more traffic controllers. According to various aspects of the present disclosure, there may be more than one traffic controller in close proximity to the automobile or pedestrian which transmitted the safety message from step 404. In certain embodiments, each traffic controller transmits its SPAT message to the cloud-based server, and the cloud-based server determines, based on received safety messages, to which devices to further transmit the SPAT information. As will be described below, the mobile device later decides which SPAT to use for presenting alerts to the user. In some embodiments, the system employs an event-driven SPAT technique, where the traffic intersection controller units 108 and/or the additional traffic equipment 220 only transmit or emanate their respective SPAT messages in response to an "event." Generally, in one embodiment, an event may include a light state change, or reaching a certain threshold on a signal timer, or any other event that may be of use for generating a traffic related alert. According to various aspects of the present disclosure, implementing an event-driven SPAT technique reduces strain on the cellular network 106, where constant or frequent transmission of SPAT messages introduces unnecessary signal traffic within the network 106 and occupies valuable network bandwidth.

At step 408, the intersection geometry is transmitted from the cloud-based server to the mobile computing device. In one embodiment, the MAP messages (e.g., intersection geometry) include an identifier or identification number indicating which intersection traffic controller the message was transmitted from, and also a timestamp representative of when the message was initially created or last modified. In certain embodiments, the most recent copies of the MAP messages may be stored locally at the mobile computing device or automobile computing system. Furthermore, and according to various aspects of the present disclosure, the SPAT messages transmitted from traffic controllers also include an identifier or identification number corresponding to the intersection from which the message was transmitted. Upon receiving a SPAT message, the mobile computing device may query the traffic controller server with the received identification number for the MAP message at the server and further compare the timestamp of the queried MAP message with the locally stored MAP message. If the timestamps are not consistent, the mobile computing device may replace the locally stored MAP message with the more recent MAP message from the traffic controller server. In some embodiments, during initialization of the system and mobile application, each MAP message received by the mobile computing device may be the most recent MAP message and is furthermore locally stored.

According to various aspects of the present disclosure, MAP messages may be transmitted over cellular connections (or other connections such as internet, Bluetooth, RF, etc.) that are separate and independent from the connections used for communicating the BSM, PSM, and SPAT data. For example, in one embodiment, if a mobile computing device receives a SPAT message associated with an identification number corresponding to an intersection for which the mobile computing device does not have MAP data cataloged or stored, the mobile computing device may request or retrieve the appropriate MAP data from a database of MAP data. In various embodiments, this database may be stored local to the corresponding traffic controller unit, or the database may be remote (e.g., stored via the cloud-based server). In a particular embodiment, the MAP data may be accessed via a URL or other type of address (which may include at least a portion of the intersection identification number) for locating the MAP data in storage. In certain embodiments, allowing for the MAP data to be retrieved/accessed over a separate communication link than the BSM, PSM, and SPAT data reduces network traffic and bandwidth overloads, thus improving the overall efficiency of the system for presenting traffic alerts.

Proceeding now to step 410, the mobile computing device may determine the appropriate SPAT to process based at least on intersection geometry and GPS. In one embodiment, the logic within the mobile application includes instructions for comparing the GPS readings from the mobile computing device to the coordinates included in the intersection geometry. Furthermore, based on the GPS readings if it is determined that the automobile is heading in a particular direction towards one intersection and away from others, the SPAT messages relating to the other intersections may be disregarded. For example, consider a car driving down a city street. There may be a plurality of traffic lights within a 1000 ft. radius of the car, and the mobile device operatively running the mobile application for receiving traffic alerts may receive a SPAT message from each traffic controller associated with each of the plurality of traffic lights. In this scenario, the mobile computing device may determine that only one of the SPAT messages is relevant for presenting alerts based on the position, speed, and trajectory of the car compared to the coordinates included in the intersection geometry received for each of the corresponding SPAT messages. Accordingly, despite receiving a plurality of SPAT messages at the mobile computing device, the decision logic included in the mobile application determines the appropriate SPAT message to process for presenting traffic alerts to the user.

Continuing to step 412, in one embodiment, the remaining SPAT message from step 510 is used in conjunction with the corresponding MAP data for determining how to present alerts to the user. For example, upon determining that a particular SPAT message corresponds to the next traffic intersection that the particular user is approaching, the mobile computing device associated with the user will present the user with alerts that correspond with the current state of the light, the timing between next states, etc. For example, upon approaching a traffic light on a city street, the screen on the user's mobile device may display a visual indication of the traffic lights corresponding to each lane, such as turning lanes and thru lanes. Furthermore, in one embodiment, the mobile device may present the user with an audible alert based on the timing included in the SPAT message and corresponding to the next state of the light at the traffic intersection. For example, if the current state of the light is red and the user is currently stopped at the light, once the light is about to turn from red to green (e.g., 5 seconds), the mobile application may present the user with an audible "Get ready for green!" alert, thereby notifying the user to be prepared to take action.

Figure 5:
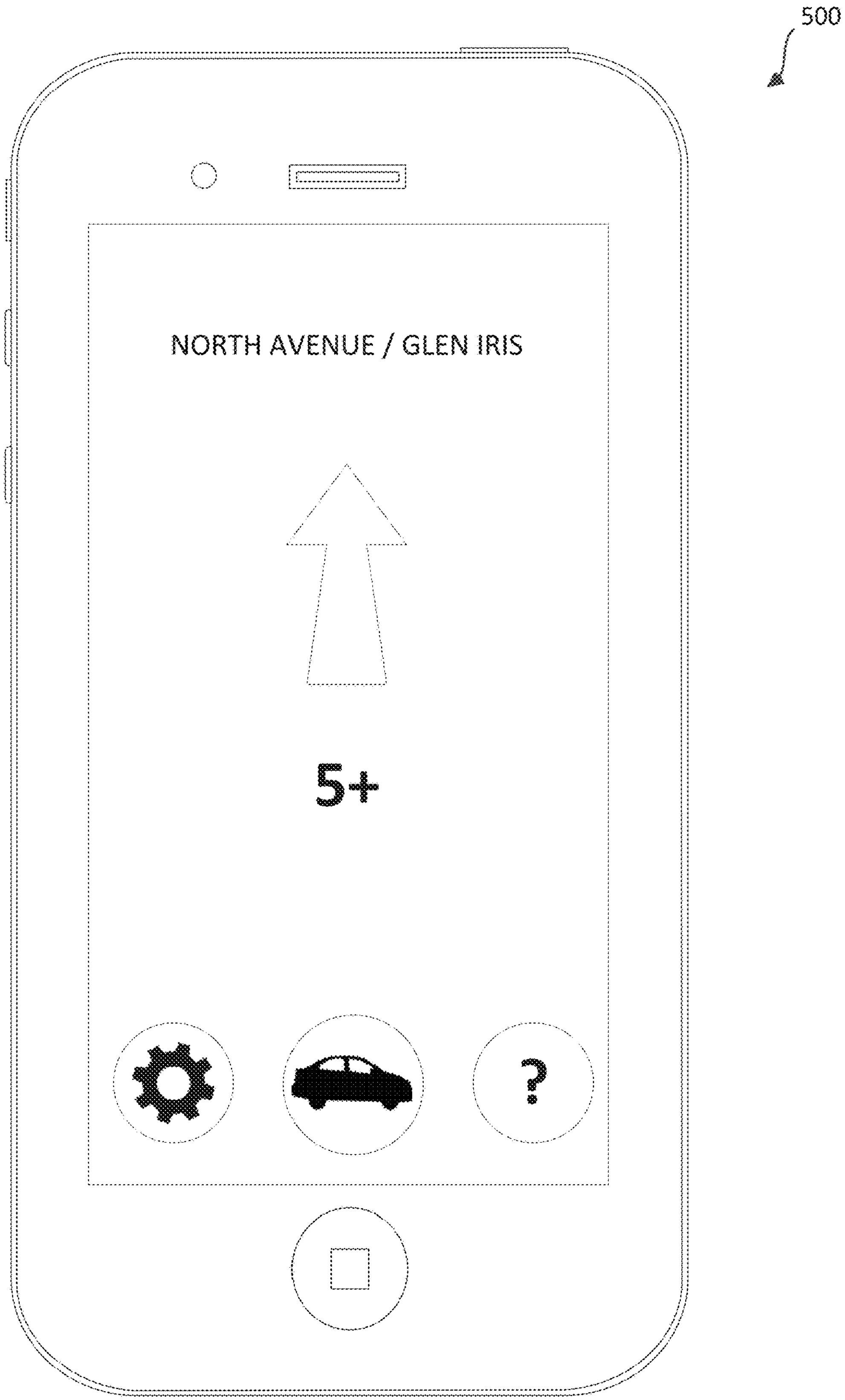
FIG. 5 is a screenshot of a mobile application illustrating a particular traffic light state, according to one aspect of the present disclosure.

Looking now at FIG. 5, a screenshot 500 of a mobile application illustrating a particular traffic light state is shown, according to one aspect of the present disclosure. In one embodiment, the mobile application may be operating in conjunction with a driver's mobile computing device (e.g., a smart phone) or the mobile application may be operating in conjunction with the built-in computing system within the driver's automobile. As shown in the present embodiment, a straight arrow is displayed with a timer (5+) shown underneath the arrow, and the arrow may be filled with color according to the current state of corresponding traffic light. According to various aspects of the present disclosure, this view of the mobile application may be presented to a driver upon approaching a particular traffic intersection where the current state of the traffic light is red but soon to turn green (as indicated by the timer). In some embodiments, if the traffic light will remain red (or green) for a substantially longer duration of time, such as 60 seconds, a timer showing 60+ may be displayed within the mobile application or no timer at all may be displayed. In various embodiments, the mobile application may generate an audible alert such as "Get ready for green," when the timer is soon to expire, thereby notifying the driver to pay attention to the light and prepare to operate his/her automobile.

Figure 6:
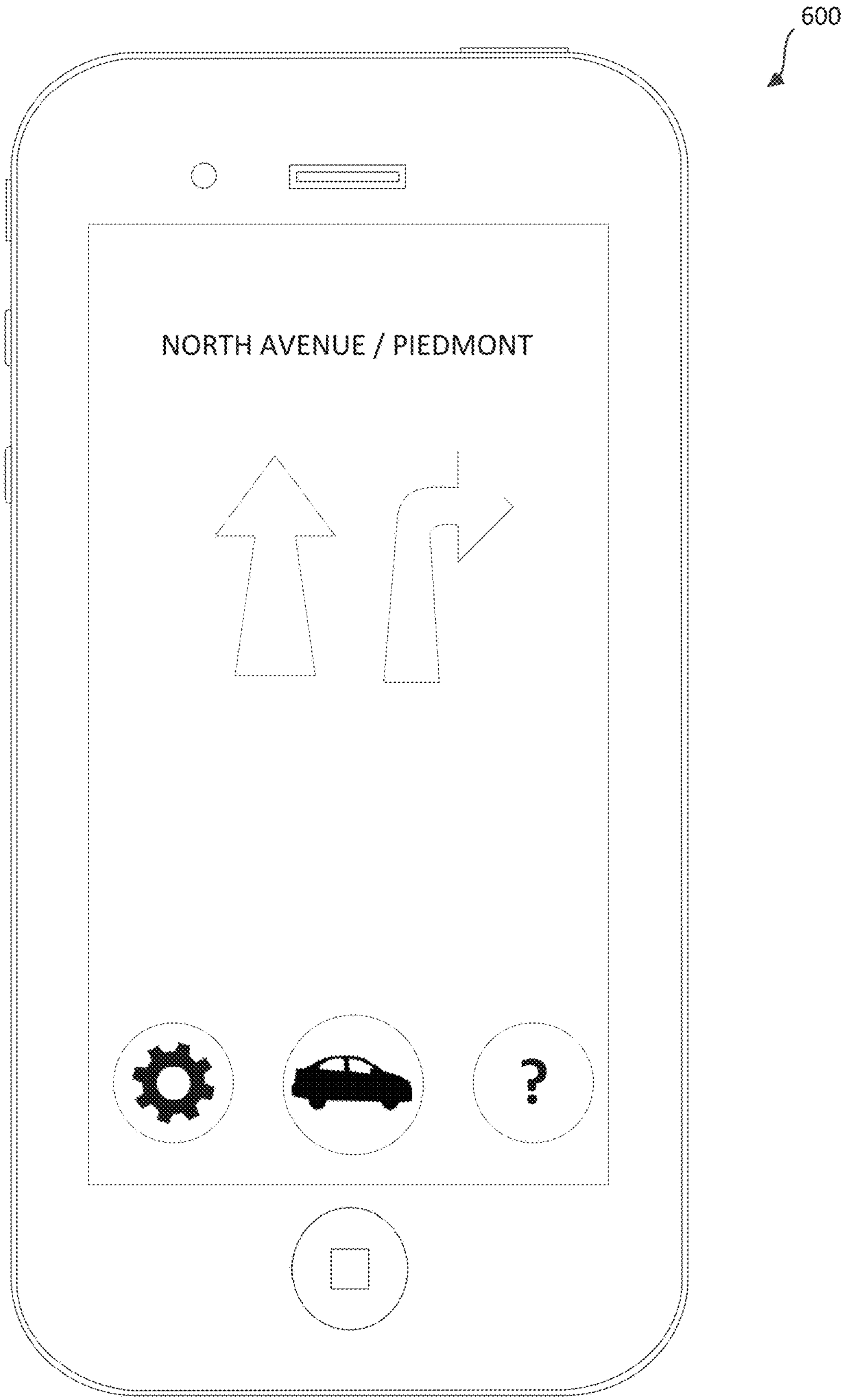
FIG. 6 is a screenshot of a mobile application illustrating a particular traffic light state, according to one aspect of the present disclosure.

In one embodiment, FIG. 6 is a screenshot 600 of a mobile application illustrating a particular traffic light state. As shown in the present embodiment, two arrows are displayed on the mobile application, a straight arrow and a right-curved arrow. In various embodiments, this view is displayed to a driver in response to the driver approaching a traffic intersection with multiple lane options. In particular embodiments, this view generally displays arrows corresponding to streets and the current states of the traffic lights controlling traffic flow onto those streets. It should be understood that any combination of lights and arrows corresponding to traffic lanes may be displayed within the mobile application, and the combination of lights and arrows may change in response to a change in state at the traffic light controller.

Figure 7:
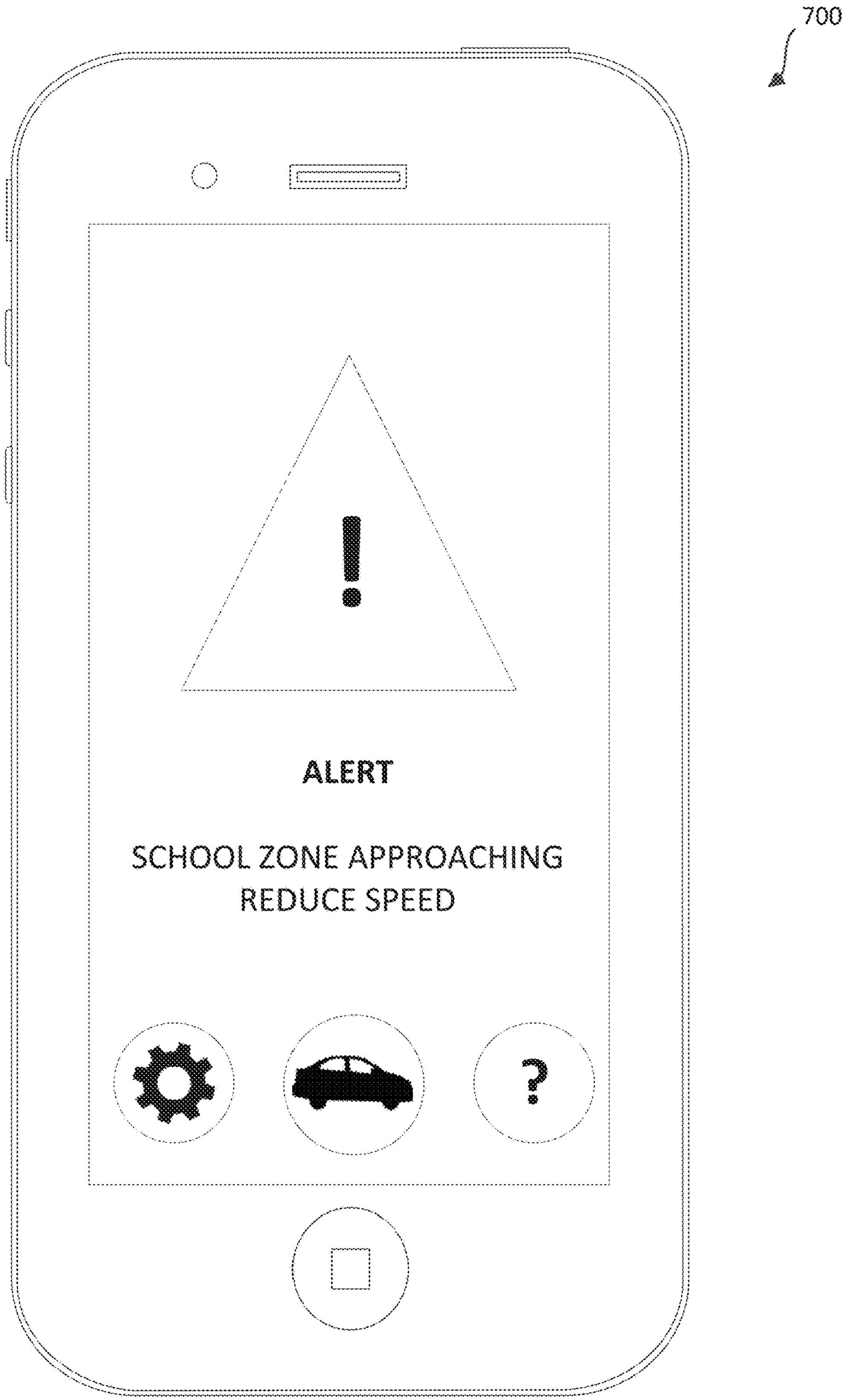
FIG. 7 is a screenshot of a mobile application illustrating a particular traffic-related alert, according to one aspect of the present disclosure.
Figure 8:
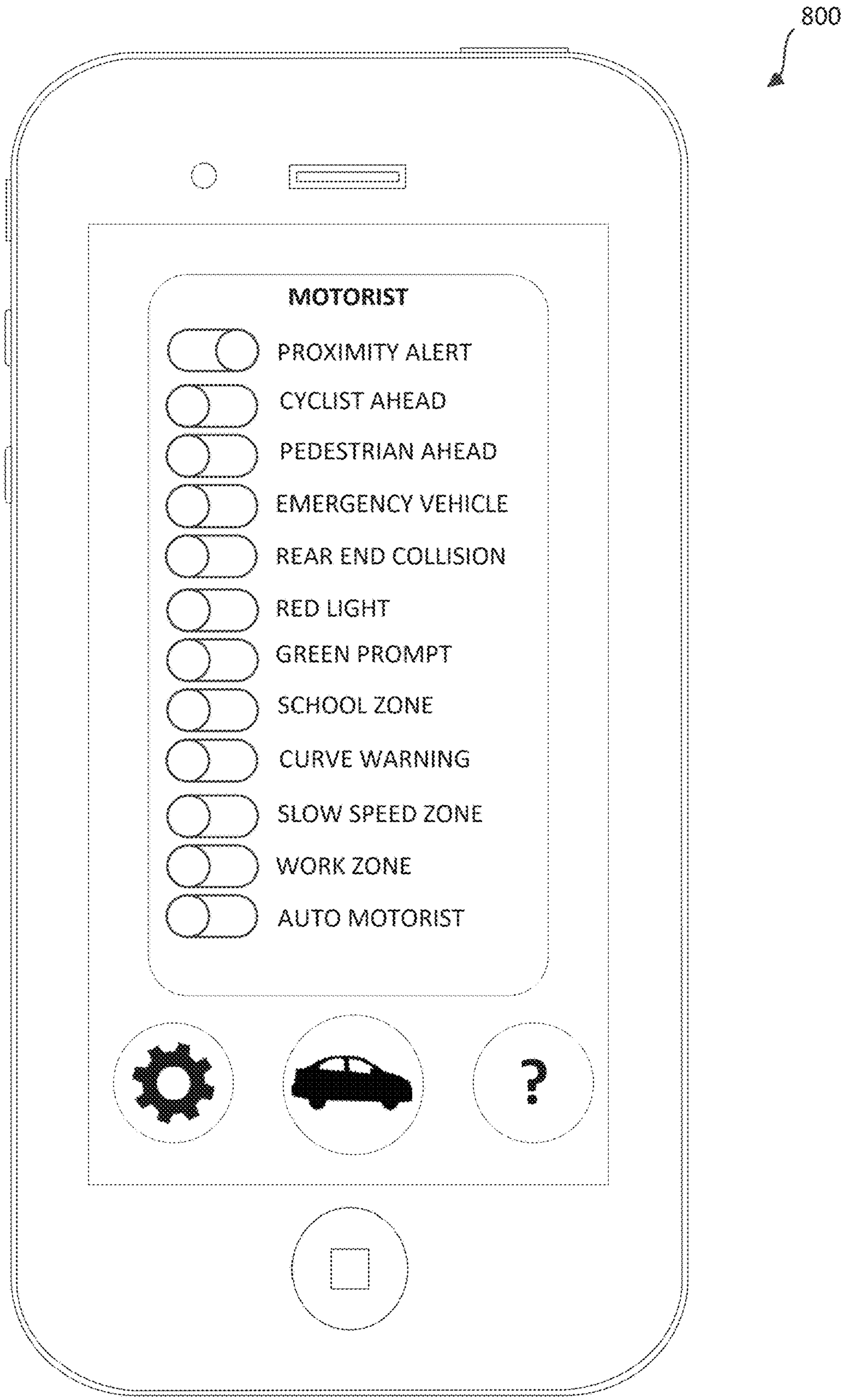
FIG. 8 is a screenshot of a mobile application illustrating particular configuration options, according to one aspect of the present disclosure.
Figure 9:
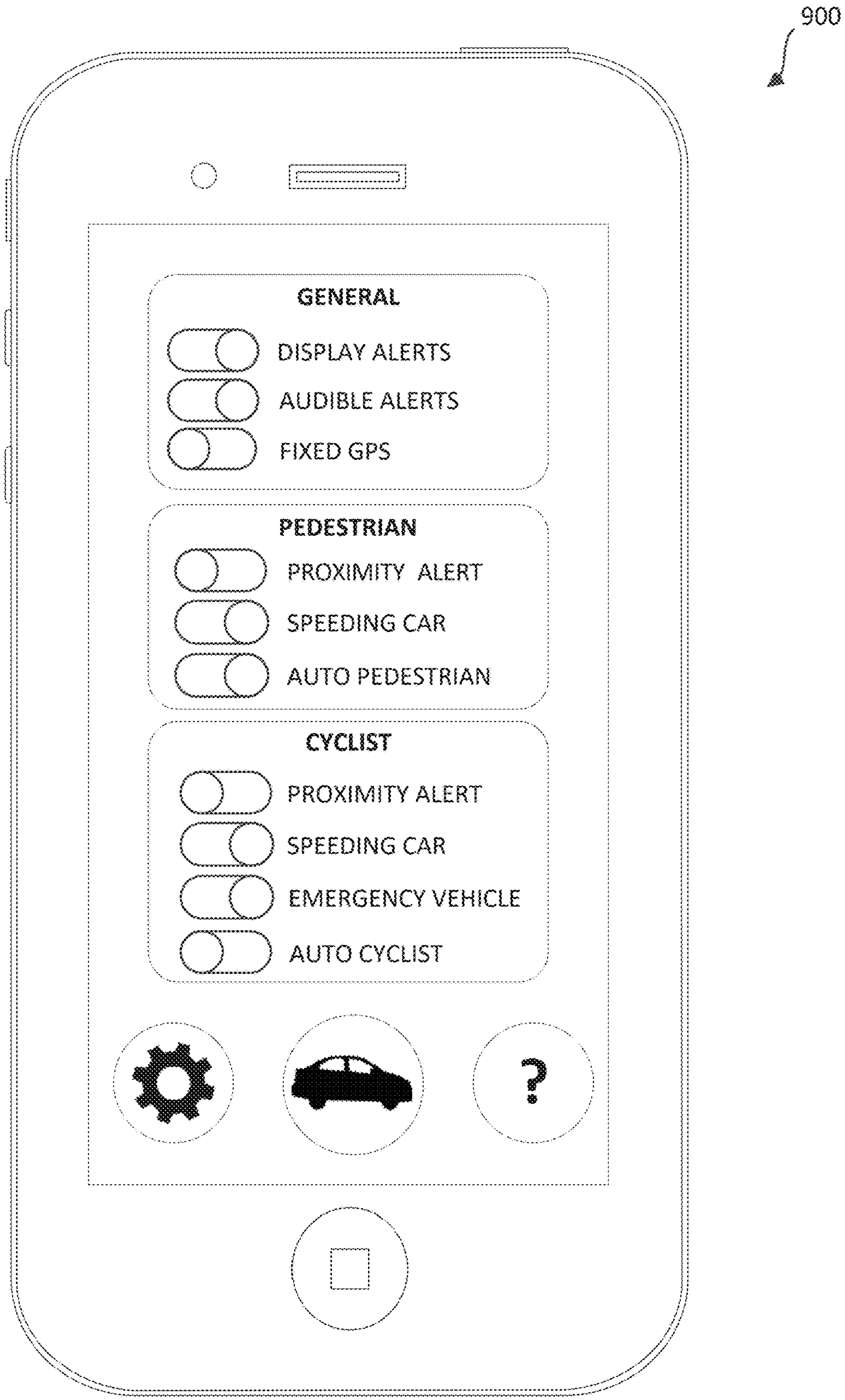
FIG. 9 is a screenshot of a mobile application illustrating particular configuration options, according to one aspect of the present disclosure.

FIG. 7 is a screenshot 700 of a particular alert on a mobile application, according to one aspect of the present embodiment. In some embodiments, an alert such as the alert shown in the present embodiment may be presented to a driver when he/she is driving over the speed limit in a geographical location classified as a school zone. In various embodiments, the user's mobile device may transmit the GPS location of the driver (included in a BSM) to a traffic light/traffic controller or beacon in the school zone, which in turn may transmit data back to the mobile device (via SPAT and/or MAP data) indicating that the area is a school zone. In response to receiving the data from the traffic light/traffic controller or beacon, the mobile device may present the driver with the alert shown in the present embodiment if the driver is exceeding the speed limit for the particular school zone. According to various embodiments, these and other aspects may be configured by the user in a settings/configurations menu, such as those shown in the embodiments of FIGS. 8-9.

Figure 10:
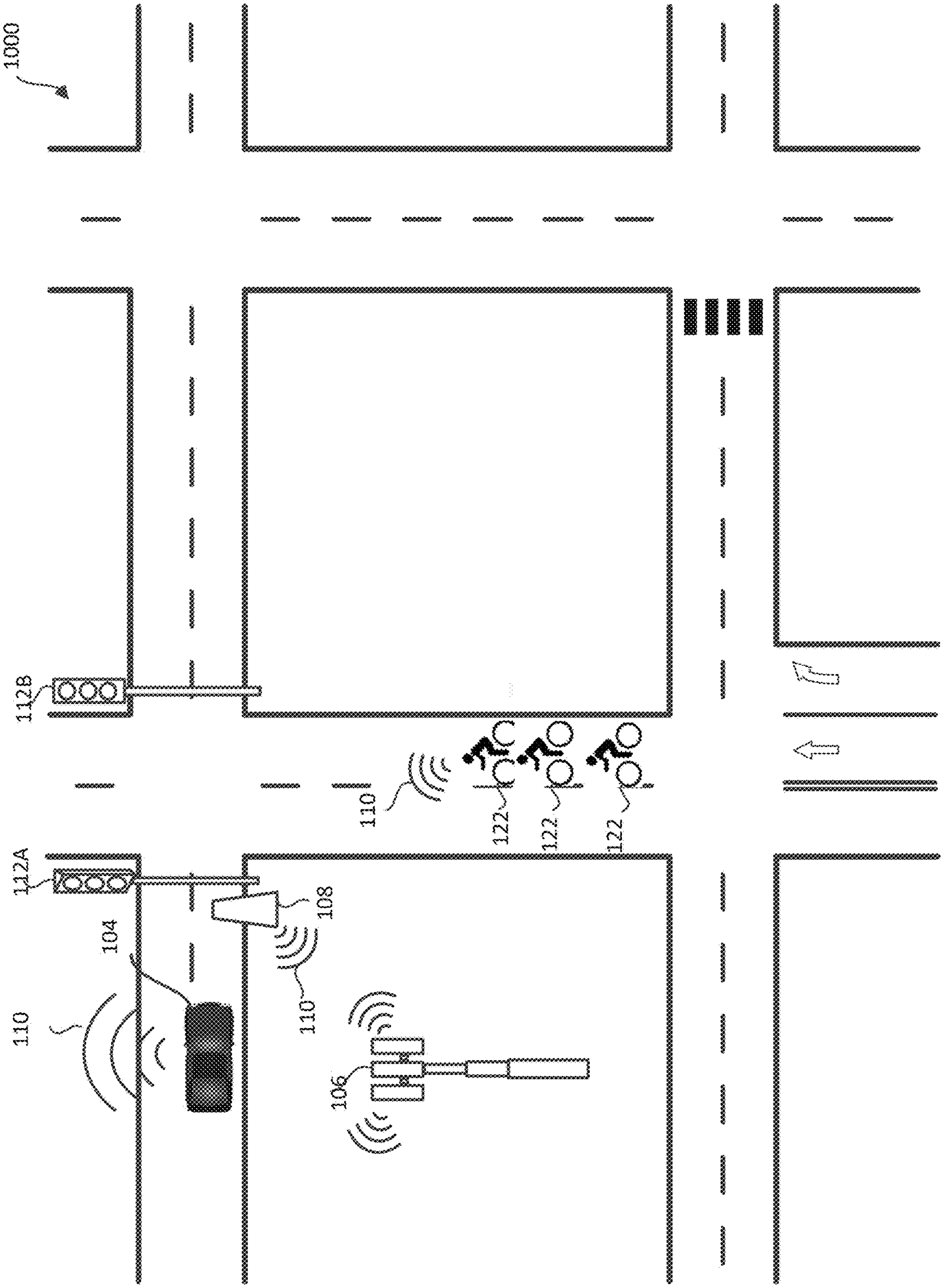
FIG. 10 illustrates an additional exemplary operational environment of the present system, according to one aspect of the present disclosure.

FIG. 10 illustrates an additional exemplary operational environment 1000 of the present system, according to one aspect of the present disclosure. As with the operational environment 100 of FIG. 1, the operational environment 1000 is a roadway that can include various motor vehicles, cyclists, and, in some embodiments, pedestrians. According to various aspects of the present disclosure, the operational environment 1000 includes various networked components including (but not limited to) mobile phones, various signal transmitters and receivers, cellular modems, sensors including GPS, velocity, Wi-Fi, and Bluetooth sensors, and processors for analyzing data, readings, and requests from each of these various networked components. In one embodiment, the illustrated network of hardware, computing devices, and components allows for various improvements in traffic management such as allowing for a user to change traffic light states on-demand (or in the future), and allowing for individuals to receive traffic alerts unique to their position and direction of travel, where the alerts provide the individuals with information for allowing them to make better traffic-related decisions.

As depicted in the present embodiment, the operational environment 1000 includes a motor vehicle such as a car 104. According to various aspects of the present disclosure, at least one network component for allowing devices in the system to communicate is the cellular network 106, or cellular network backbone. In one embodiment, the cellular network 106 is operable to transmit and receive cellular data to and from vehicles including the car 104 and cyclists 122, as well as to transmit and receive cellular data to and from the traffic intersection controller unit 108. As shown in the present embodiment, the car 104, the cyclists 122, and the traffic intersection controller units 108 each includes emanating signal waves 110 indicating active communication between these components and the cellular network 106. While the operational environment 1000 is described as providing communication between the traffic intersection controller unit 108 and vehicles or pedestrians using the cellular network 106, other communication schemes may also be used. For example, the vehicles and/or pedestrians may additionally or alternatively communicate with the traffic intersection controller unit 108 using radio frequency (RF) signals.

Continuing with FIG. 10, the traffic intersection controller unit 108 is generally an enclosed structure or cabinet that includes various hardware components for controlling the states of a plurality of traffic lights 112A and 112B at a corresponding intersection. According to various aspects of the present disclosure, the traffic intersection controller unit 108 may initiate modifications to the current or future states of the traffic lights 112A and 112B in response to receiving particular signals from the vehicles in the operational environment 1000, and the traffic intersection controller unit 108 may furthermore transmit information relating to the states of the traffic lights 112A and 112B to the car 104 and the cyclists 122 (for example).

In a particular embodiment, the operational environment 1000 supports a scenario (as depicted in the present embodiment) where the car 104 and a peloton of cyclists 122 approach the traffic lights 112A and 112B. The peloton of cyclists 122 may represent a group of two or more cyclists 122 that are traveling within a certain distance of one another. In an example, the traffic intersection controller unit 108 may establish identification of the peloton of cyclists 122 when two or more cyclists 122 are determined to be traveling within 10 feet of one another in the operational environment 1000. When approaching the traffic light 112B during a red light state, the peloton of cyclists 122 may be required to stop at the traffic light 112B. Stop and go travel by the cyclists 122 is typically undesirable for both the cyclists 122 and other vehicles on the road due to relatively slow accelerations of the cyclists 122 compared to other vehicles.

The present disclosure presents a solution to this problem through a priority ranking system, where the traffic intersection controller unit 108 receives the cellular signals 110 from the car 104, the cyclists 122, or any other vehicles, and the traffic intersection controller unit 108 determines a traffic signal priority rankings for the various vehicles. In this manner, when the traffic intersection controller unit 108 identifies or receives an indication that the cyclists 122 form a peloton and that a vehicle, such as the car 104, has a lower traffic signal priority than the peloton, the traffic intersection controller unit 108 is able to transition the traffic light 112B from a red light state to a green light state. In an additional example, the traffic intersection controller unit 108 may maintain a green light state of the traffic light 112B when the peloton with a greater priority than other vehicles is detected. For example, the green light state may be maintained for a longer period than originally scheduled at the traffic light 112B. Implementing this priority system eases travel for vehicles that benefit from avoiding red light states upon arrival at the traffic intersection.

In various embodiments, the vehicle 104 and the cyclists 122 may each transmit a Basic Safety Message (BSM) or a Personal Safety Message (PSM) to the traffic intersection controller unit 108. The BSM and PSM type messages may be standard message types that include data such as vehicle speed, heading, acceleration, vehicle size, position data, etc. The traffic intersection controller unit 108 may determine traffic signal priority by analyzing the data received in the BSM or PSM. For example, the traffic intersection controller unit 108 may identify the peloton of cyclists 122 by determining that two or more cyclists are within a threshold number of feet from one another. In some examples, the peloton may be established when the cyclists are within 20 feet of one another. Other distances may also be used as the threshold. In additional examples, the peloton may be established by identifying both distance from one another and velocity of the cyclists 122. For example, the traffic intersection controller unit 108 may identify the peloton when the cyclists 122 are traveling within 20 feet of one another and be within 5 mph of one another. In still additional examples, the BSM or PSM of each cyclist 122 may be accompanied by an identification component that identifies the cyclist 122 as a cyclist. In such an example, the traffic intersection controller unit 108 may rely on the identification information and the proximity information of the cyclists 122 to identify the peloton. Other techniques may also be used to determine that a group of cyclists 122 are traveling together as a peloton.

Once the peloton of cyclists 122 is identified, the signal, phase, and timing (SPAT) data corresponding to the traffic intersection controller unit 108 and traffic lights 112A and 112B may be analyzed to help determine the priority level of the vehicles approaching the traffic lights 112A and 112B. In certain embodiments, the traffic intersection controller unit 108 may use the velocity information provided by the car 104 and the cyclists 122 to determine that the light phases of the traffic lights 112A and 112B are already optimized for both the car 104 and the cyclists 122 to travel through the intersection in an uninterrupted manner. For example, based on the distance of the car 104 and the cyclists 122 from the intersection and the velocity of the car 104 and the cyclists 122, the traffic intersection controller unit 108 may determine that a current red light state of the traffic light 112B will transition to a green light state by the time the cyclists 122 reach the intersection and that the current green light state of the traffic light 112A will be maintained until the car 104 traverses the intersection.

In an additional example, the traffic intersection controller unit 108 may determine that the light phases of the traffic lights 112A and 112B are not optimized for the approaching vehicles. In such an example, the traffic intersection controller unit 108 may adjust the light phases based on the traffic signal priority of the vehicles approaching the traffic lights 112A and 112B. For example, the peloton of cyclists 122 may have a greater traffic signal priority than the car 104. Accordingly, the traffic intersection controller unit 108 may transition the traffic light 112B to a green light state, or maintain the traffic light 112B in the green light state, when the peloton of cyclists 122 reach the intersection. In an example of a single cyclist 122 and the car 104, or any other vehicles with the same traffic signal priority, approaching the traffic lights 112A and 112B, the single cyclist 122 and the car 104 may have the same traffic signal priority, and the light phases of the traffic lights 112A and 112B may continue without adjustment by the traffic intersection controller unit 108.

Traffic signal priority may also be assigned based on a lack of other vehicles approaching the traffic lights 112A and 112B. For example, any vehicle or pedestrian approaching the traffic lights 112A and 112B may have priority at the intersection when no other vehicles are approaching the intersection. In such an example, the traffic intersection controller unit 108 may transition the traffic lights 112A or 112B to a green light state or maintain the traffic lights 112A or 112B at the green light state when an individual vehicle or pedestrian is detected—and no other vehicles or pedestrians are detected—approaching the intersection.

In some examples, the priority levels of each vehicle, detected groups of vehicles, pedestrians, and detected groups of pedestrians may be stored in computer memory at the traffic intersection controller unit 108. Accordingly, the traffic intersection controller unit 108 may make an intersection priority determination for each vehicle, group of vehicles, pedestrians, or group of pedestrians approaching the intersection. In additional examples, the priority levels of each vehicle, detected groups of vehicles, pedestrians, and detected groups of pedestrians may be stored in computer memory at a server remote from the traffic intersection controller unit 108. In such an example, the traffic intersection controller unit 108 may query the remote server for an intersection priority determination for each vehicle, group of vehicles, pedestrians, or group of pedestrians approaching the intersection.

Figure 11:
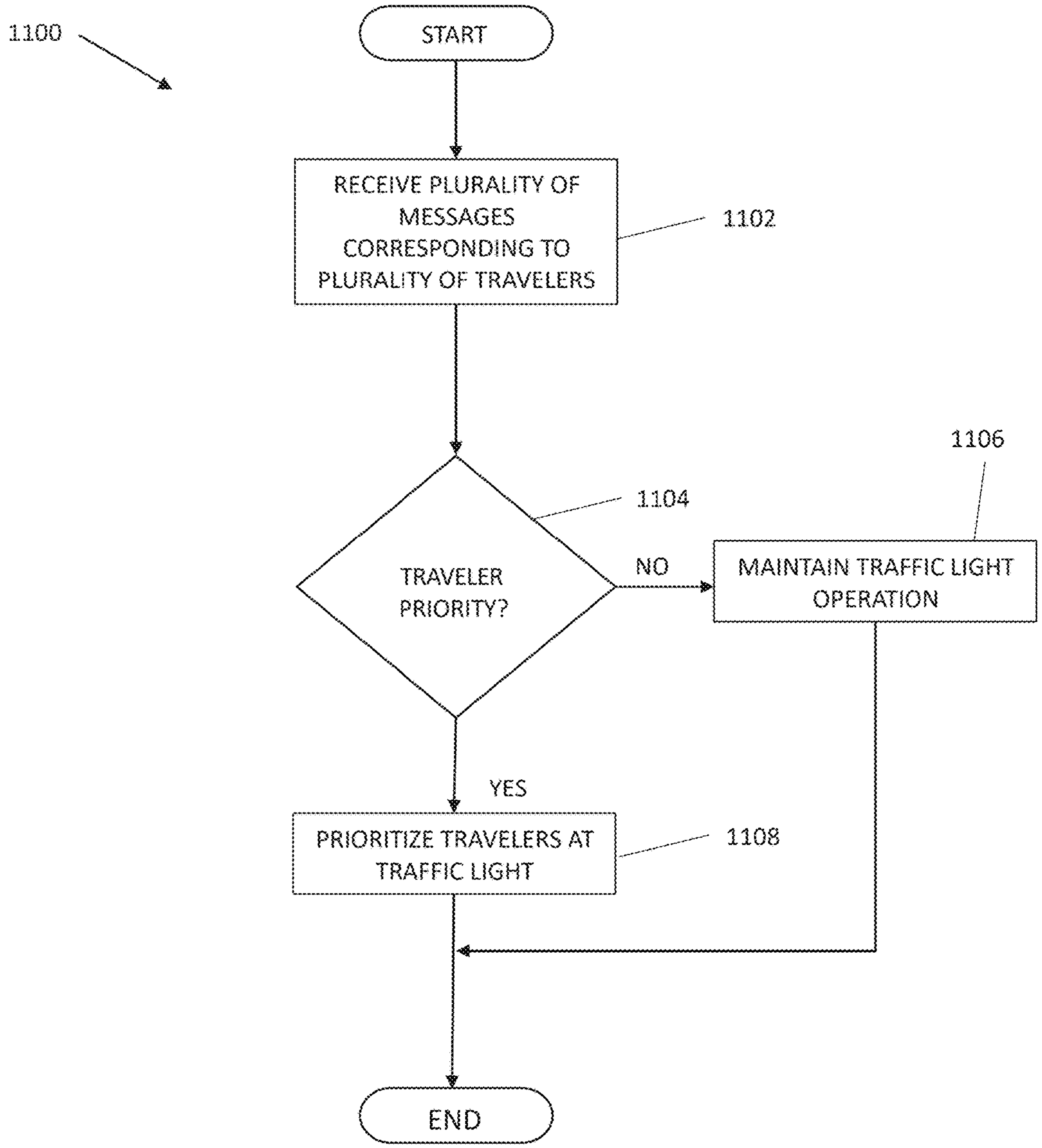
FIG. 11 is a flowchart illustrating a process for controlling traffic lights using traffic signal priorities of vehicles, according to one aspect of the present disclosure.

FIG. 11 is a flowchart illustrating a process 1100 for controlling traffic lights using traffic signal priorities of vehicles, according to one aspect of the present disclosure. In one embodiment, this process allows for the traffic intersection controller unit 108 to receive at least the location and speed of a vehicle or pedestrian (based on a BSM or PSM, respectively), and to further change the state of the controller unit 108 based on the received data and a determined priority level of the automobile, cyclist, pedestrian, or other vehicle. Changing the state of a traffic light 112 to accommodate prioritized vehicles or pedestrians enables the vehicles or pedestrians to efficiently navigate intersections. According to one aspect of the present disclosure, the process 1100 begins at block 1102, where the traffic intersection controller unit 108 receives a plurality of messages corresponding to a plurality of travelers approaching an intersection associated with the traffic intersection controller unit 108. In various embodiments, this transmission is accomplished via the cellular tower 106 and the supporting cellular backbone infrastructure. In additional embodiments, the transmission may be accomplished using radios at the traffic intersection controller unit 108 and the vehicles. In a particular embodiment, the messages include the BSM and/or PSM data relating to the particular vehicles or pedestrians approaching the intersection, and the messages provide the traffic intersection controller unit 108 with information such as position, speed, etc. of the vehicles or pedestrians.

At block 1104, the process 1100 involves determining if one or more vehicles or pedestrians approaching the intersection has priority at the intersection. For example, the traffic intersection controller unit 108 may determine that a group of vehicles approaching the intersection is a peloton of cyclists 122 based on velocity and proximity of the approaching group of vehicles. The peloton of cyclists 122 may have a greater priority level than a car 104 also approaching the intersection, while an individual cyclist 122 may have the same priority level as the car 104. The traffic intersection controller unit 108 may also determine other priority levels associated with types and groupings of other vehicles or pedestrians detected arriving at the intersection. If a traveler or group of travelers approaching the intersection has a greater priority level than another traveler approaching the intersection, then traveler priority at the intersection is determined. If the traffic intersection controller unit 108 determines that travelers approaching the intersection have the same priority level, then no traveler priority at the intersection is identified.

If traveler priority is not identified at the intersection, then, at block 1106, the process 1100 involves maintaining the traffic light operation already in place. For example, the traffic intersection controller unit 108 may maintain the present timing schedule for the phases of the traffic lights 112. In an example, two cars 104 approaching the traffic lights 112 from two directions may result in determining no traveler priority and maintaining the present timing schedule of the traffic lights 112.

If the traveler priority is identified at the intersection, then, at block 1108, the process 1100 involves prioritizing travelers approaching the traffic lights 112. As depicted in FIG. 10, when the car 104 and the peloton of cyclists 122 approach the traffic lights 112A and 112B from different directions, the peloton of cyclists 122 may have a greater priority level than the car 104. Accordingly, the traffic intersection controller unit 108 may prioritize the peloton of cyclists 122 by controlling the traffic light 112B from a red light state to a green light state or by maintaining a green light state beyond the present timing schedule of the traffic light 112B.

In summary, the process 1100 includes receiving communication signals at a traffic controller from a vehicle or pedestrian approaching an intersection, determining priority levels of the vehicles and pedestrians at the intersection, and controlling the state of the traffic controller based on the priority levels of the vehicles and the pedestrians (if appropriate). In some embodiments, the process 1100 may include additional operations, such as before the block 1104, where the traffic controller may process at least a portion of the received signal(s) for determining the priority levels of the vehicles or pedestrians associated with the signals.

Referring again to FIG. 10, the traffic intersection controller unit 108 may periodically transmit the signal, phase, and timing (SPAT) data corresponding to the traffic lights 112A and 112B to vehicles approaching the intersection associated with the traffic intersection controller unit 108. In some embodiments, the system employs an event-driven SPAT technique, where the traffic intersection controller units 108 only transmit the SPAT messages in response to an "event." The event may include a light state change, reaching a certain time threshold on a signal timer, detecting the approach of a vehicle or pedestrian to the intersection, or any other event that may be of use for generating a traffic related alert. According to various aspects of the present disclosure, implementing the event-driven SPAT technique may reduce strain on the cellular network 106, where constant or frequent transmission of SPAT messages introduces unnecessary signal traffic within the network 106 and occupies valuable network bandwidth.

In some examples, a change to the signal timing resulting from priority levels of the vehicles or pedestrians approaching the intersection of the traffic intersection controller units 108 may be a triggering event. In such an example, the traffic intersection controller units 108 may transmit the SPAT message to all of the vehicles or pedestrians approaching the intersection with the new SPAT information triggered by the priority levels of the approaching vehicles or pedestrians. In an additional example, the triggering event may be the car 104 approaching within a predefined distance of the intersection. In such an example, the traffic intersection controller units 108 may avoid transmitting SPAT messages when there are no vehicles that would benefit from receiving the SPAT messages.

Figure 12:
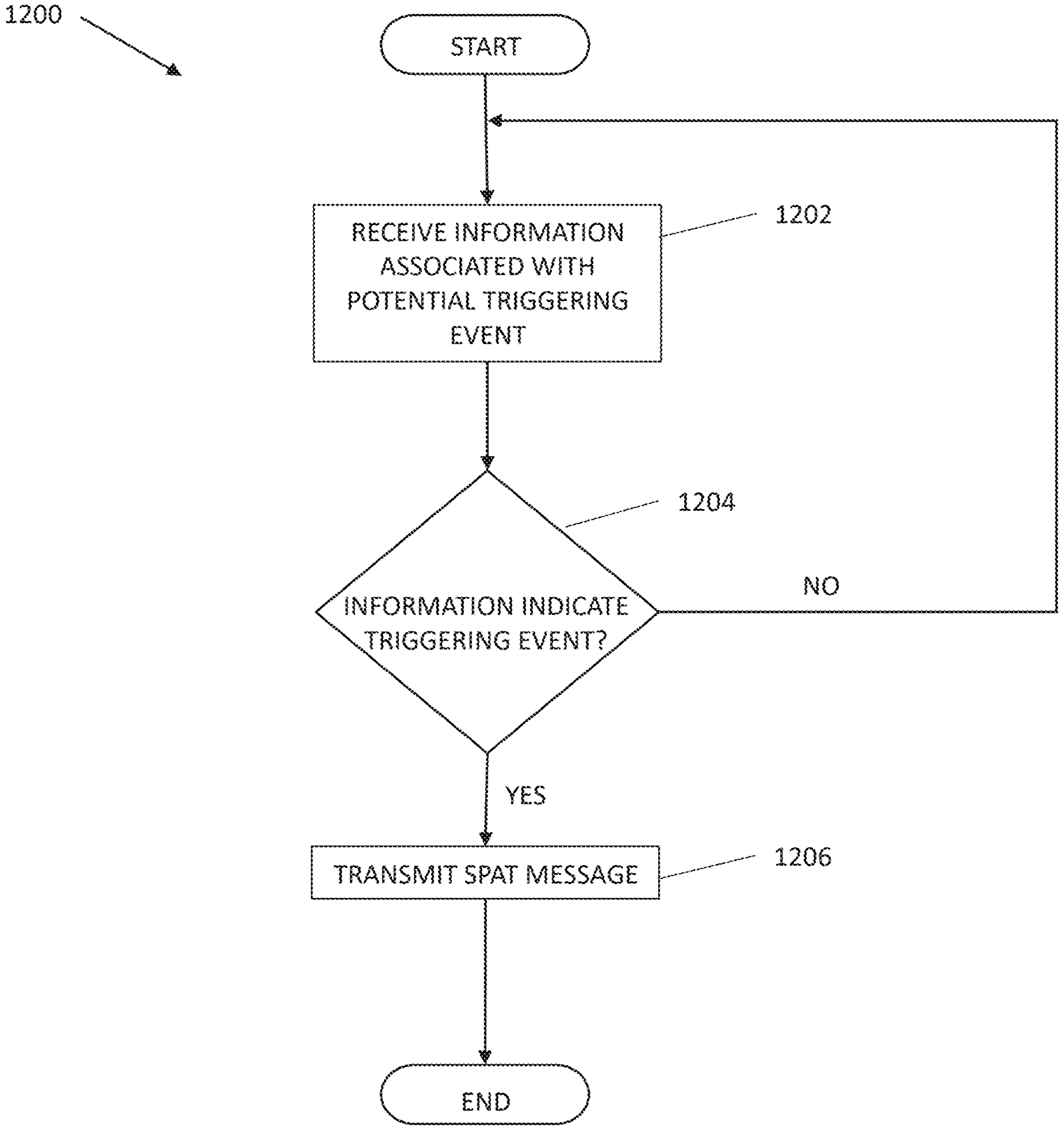
FIG. 12 is a flowchart illustrating a process for transmitting event-driven signal, phase, and timing (SPAT) messages, according to one aspect of the present disclosure.

FIG. 12 is a flowchart illustrating a process 1200 for transmitting event-driven signal, phase, and timing (SPAT) messages, according to one aspect of the present disclosure. In one embodiment, this process enables the traffic intersection controller unit 108 to reduce a number of SPAT messages by only transmitting the SPAT messages when a triggering event occurs. The triggering event may be an arrival of a vehicle or pedestrians at an intersection, a light state change, reaching a certain threshold on a signal timer, or any other event that may be of use for generating a traffic related alert. Reducing SPAT messages may reduce unnecessary signal traffic on a cellular network at the intersection. According to one aspect of the present disclosure, the process 1200 begins at block 1202, where the traffic intersection controller unit 108 receives information associated with a potential triggering event. In various embodiments, the information may include a light state change or an indication of reaching a certain threshold on a signal timer. These triggering events may be generated internally by the traffic intersection controller unit 108 based on the SPAT information of the traffic lights 112 at the associated intersection. In another example, the information associated with the potential triggering event can be information indicating the occurrence of any other event that may be of use for generating a traffic related alert. For example, the information may include an indication that a vehicle or a pedestrian is approaching an intersection associated with the traffic intersection controller unit 108. In some example, the indication that the vehicle is approaching the intersection may be a BSM and/or a PSM transmitted from the vehicle or a mobile device of the pedestrian.

At block 1204, the process 1200 involves determining whether the received information actually indicates a triggering event. For example, the traffic intersection controller unit 108 may receive a BSM and/or a PSM from a vehicle or pedestrian that is near the intersection, but the heading and speed of the vehicle or pedestrian may indicate that the vehicle or pedestrian is not actually approaching the intersection or that the vehicle or pedestrian is far enough away from the intersection that the available SPAT messages are not yet relevant. Similarly, the traffic intersection controller unit 108 may constantly track light state change and signal timers, but the light state changes and signal timers may not always indicate a triggering event. For example, a light state change with no detected vehicles or pedestrians at or near the intersection may not qualify as a triggering event. Similarly, the signal timer may not be a triggering event until a timer threshold is met. In other words, the traffic intersection controller unit 108 may constantly monitor the signal timer, but the triggering event does not occur until a timing threshold is surpassed by the signal timer.

If the information received by the traffic intersection controller unit 108 does not indicate a triggering event, then the process 1200 returns to block 1202 to receive additional information associated with subsequent potential triggering events. If the information received by the traffic intersection controller unit 108 does indicate the triggering event, then the process 1200 proceeds to block 1206. At block 1206, the process 1200 involves transmitting a SPAT message to vehicles or pedestrians approaching the intersection of the traffic intersection controller unit 108. The SPAT message may provide the vehicles or pedestrians with information associated with the operation of the traffic lights 112 at the intersection. An application running on a computing system of the vehicle or on a mobile device of the pedestrian may provide an operator of the vehicle or the pedestrian with an indication of the upcoming signal phases of the traffic lights 112 at the approaching intersection.

In some examples, the traffic intersection controller unit may transmit the SPAT message to a cloud-based server, and the cloud-based server may transmit the SPAT message to the mobile device of the vehicles and/or pedestrians approaching the intersection. According to various aspects of the present disclosure, there may be more than one traffic intersection controller unit 108 in close proximity to the automobiles or pedestrians approaching the intersection. In certain embodiments, each traffic controller transmits its SPAT message to the cloud-based server, and the cloud-based server determines, based on received safety messages, the devices to which further transmission of the SPAT information is desired.

Figure 13:
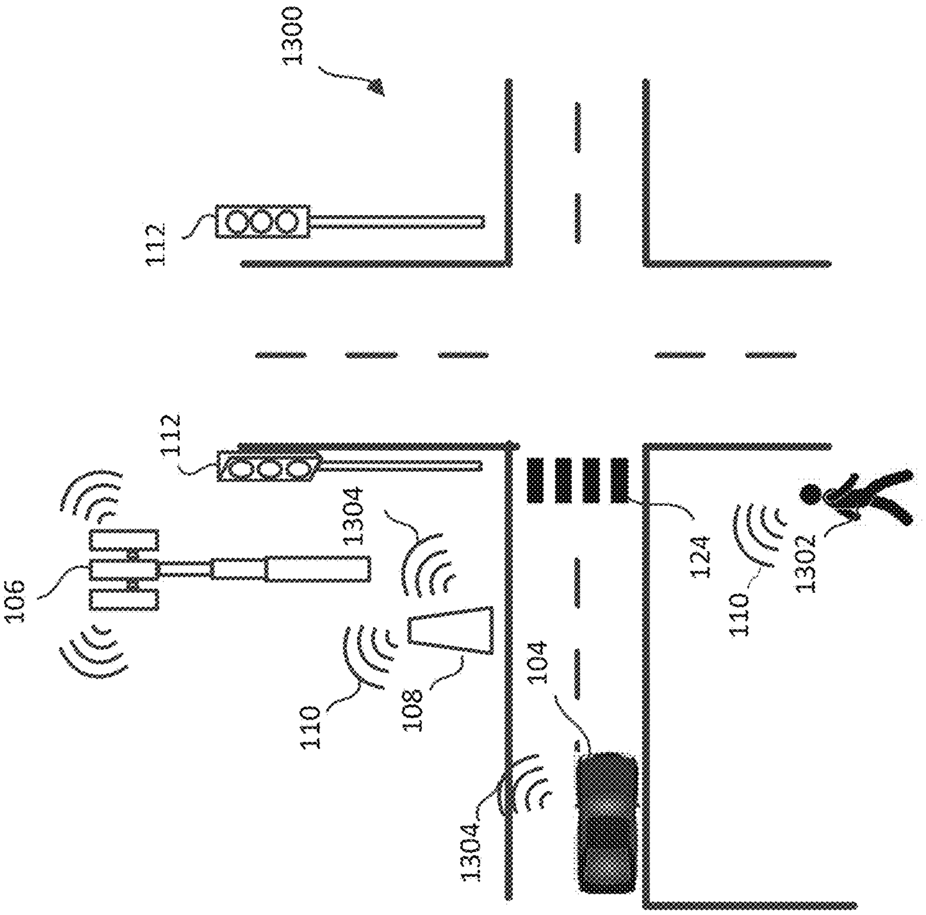
FIG. 13 illustrates an additional exemplary operational environment of the present system, according to one aspect of the present disclosure.

FIG. 13 illustrates an additional exemplary operational environment 1300 of the present system, according to one aspect of the present disclosure. The operational environment 1300 is a roadway including a motor vehicle and a pedestrian. According to various aspects of the present disclosure, the operational environment 1300 includes various networked components including (but not limited to) mobile phones, various signal transmitters and receivers, cellular modems, sensors including GPS, velocity, Wi-Fi, and Bluetooth sensors, and processors for analyzing data, readings, and requests from each of these various networked components. In one embodiment, the illustrated network of hardware, computing devices, and components enables various improvements in traffic management such as enabling a user to change traffic light states of the traffic lights 112 on-demand (or in the future), and allowing for individuals to receive traffic alerts unique to their position and direction of travel, where the alerts provide the individuals with information for allowing them to make better traffic-related decisions.

As depicted in the present embodiment, the operational environment 1300 includes a motor vehicle, such as a car 104. According to various aspects of the present disclosure, at least one network component for allowing devices in the system to communicate is a cellular network 106, or cellular network backbone. In a particular embodiment, the cellular network 106 includes the infrastructure (e.g., cell towers, receivers, transmitters, repeaters, modems, etc., for supporting broadband, 3G, 4G, 5G, LTE, etc.) for allowing computing devices, processors, and sensors to send information across a cellular medium. In one embodiment, the cellular network 106 is operable to transmit and receive cellular data to and from mobile devices of pedestrians 1302, as well as to transmit and receive cellular data to and from the traffic intersection controller unit 108. As shown in the present embodiment, the pedestrian 1302 and the traffic intersection controller unit 108 each includes emanating signal waves 110 indicating active communication between these components and the cellular network 106.

In some examples, communication between the car 104 and the traffic intersection controller unit 108 is through point-to-point communication, such as Dedicated Short-Range Communications (DSRC) or Cellular Vehicle to Everything Direct (C-V2X) in the 5.9 GHz band. The point-to-point communication may be represented by the emanating signal waves 1304 from the car 104 and the traffic intersection controller unit 108. This communication scheme may be referred to as Connected Vehicle (CV) technology communication. In such an example, the car 104 may transmit the signal to the traffic intersection controller unit 108 in a point-to-point manner using signal waves 1304 when the traffic intersection controller unit 108 is equipped with a compatible radio. While the car 104 is able to communicate directly with the traffic intersection controller unit 108, the car 104 is, in some embodiments, not able to communicate with a mobile device of the pedestrian 1302 or other cyclists, scooter riders, and/or school children that have mobile devices that communicate over the cellular network 106.

To accommodate communication between, for example, the pedestrian 1302 and the car 104 in a manner that enhances CV collision avoidance performance, the traffic intersection controller unit 108 may receive messages from the pedestrian 1302 and the car 104 and rebroadcast the messages using a communication scheme that is receivable by the other party. For example, a cell phone in possession of the pedestrian 1302 may transmit Personal Safety Messages (PSMs), which may include location, direction of travel, and speed of travel, to the cellular network 106 and to dedicated cloud servers for processing and retransmission to the traffic intersection controller unit 108 that is closest in location to the pedestrian 1302. The traffic intersection controller unit 108 can process the PSM information and rebroadcast the PSM information using a point-to-point radio. Because the car 104 is equipped with a compatible point-to-point radio, the car 104 is able to receive the PSM information from the pedestrian 1302 when the car 104 is within point-to-point communication range of the traffic intersection controller unit 108.

Similarly, the car 104 may transmit Basic Safety Messages (BSMs), which may include location, direction of travel, and speed of travel, using the point-to-point radio of the car 104 to the traffic intersection controller unit 108. The traffic intersection controller unit 108 may, in turn, process and rebroadcast the BSM information over the cellular network 106 for receipt by the mobile device of the pedestrian 1302. Accordingly, the car 104 and the mobile device of the pedestrian 1302 are able to receive communications from one another through rebroadcasting at the traffic intersection controller unit 108.

In some examples, the car 104 may process the PSM information received from the pedestrian 1302 to alert the driver or vehicle operating system of the presence of the pedestrian 1302 ahead. The car 104 may also determine if there is danger of a collision with the pedestrian 1302 and deliver an appropriate warning to a driver, automatically engage brakes of the car 104, or perform a combination thereof. Further, the mobile device of the pedestrian 1302 may receive the BSMs from the car 104 and provide a warning message to the pedestrian 1302 of a potential collision with the car 104. In an additional example, the traffic intersection controller unit 108 may receive both the PSM from the pedestrian 1302 and the BSM from the car 104, process the information to determine a likelihood of a collision, and transmit messages to both the car 104 and the mobile device of the pedestrian 1302 indicating that the potential collision may occur.

Figure 14:
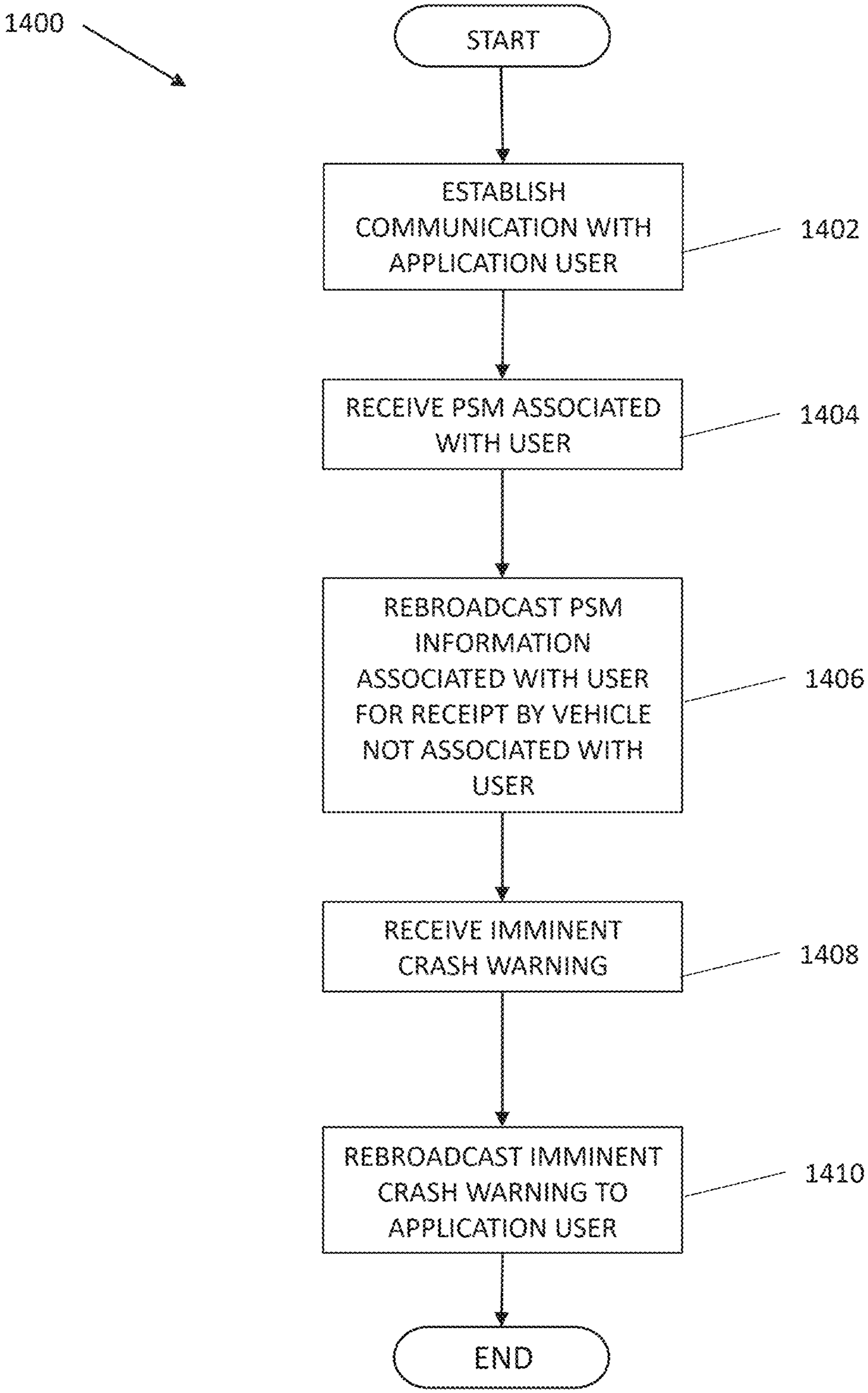
FIG. 14 is a flowchart illustrating a process for rebroadcasting messages between devices operating with incompatible communication schemes, according to one aspect of the present disclosure.

FIG. 14 is a flowchart illustrating a process 1400 for rebroadcasting messages between devices operating with incompatible communication schemes, according to one aspect of the present disclosure. In one embodiment, this process 1400 enables the traffic intersection controller unit 108 to rebroadcast communications between a mobile device of a pedestrian 1302 and a communication system of a car 104. As discussed above with respect to FIG. 13, the mobile device of the pedestrian 1302 communicates with the traffic intersection controller unit 108 over the cellular network 106, while the car 104 communicates with the traffic intersection controller unit 108 using a point-to-point radio. The traffic intersection controller unit 108 may rebroadcast these messages so that they are able to reach the car 104 or the mobile device of the pedestrian 1302. According to one aspect of the present disclosure, the process 1400 begins at block 1402, where the traffic intersection controller unit 108 establishes communication with an application user, such as the pedestrian 1302 using a mobile device. The communication may be established using the cellular network 106.

At block 1404, the process 1400 involves the traffic intersection controller unit 108 receiving movement data, such as a PSM, associated with the user. The PSM may indicate location, direction of travel, and speed of travel of the user. In some embodiments, the movement data received by the traffic intersection controller unit 108 may also include other information relevant to the user. In some examples, the PSM and other movement data associated with the user may be transmitted by the mobile device of the user when the user approaches an intersection associated with the traffic intersection controller unit 108. In additional examples, the PSM may be transmitted by the mobile device when the user enters a crosswalk associated with the traffic intersection controller unit 108.

At block 1406, the process 1400 involves the traffic intersection controller unit 108 rebroadcasting the PSM and other information to a vehicle not associated with the user. For example, the traffic intersection controller unit 108 may rebroadcast the PSM and other information using a point-to-point communication scheme that is compatible with a point-to-point radio of the vehicle, such as the car 104. The point-to-point communication scheme may be a Dedicated Short-Range Communication (DSRC) scheme or a Cellular Vehicle to Everything Direct (C-V2X) communication scheme.

At block 1408, the process 1400 involves the traffic intersection controller unit 108 receiving an imminent crash warning. In some examples, the vehicle may determine, based on the movement data (e.g., the PSM information) from the user and movement data (e.g., the BSM information) from the vehicle, that a collision is likely with the user. In an additional example, the traffic intersection controller unit 108 may receive the BSM information from the vehicle and determine, based on both the received PSM information and the received BSM information, that the collision between the vehicle and the user is likely.

At block 1410, the process 1400 involves the traffic intersection controller unit 108 rebroadcasting an imminent crash warning to the application user. In an example, the traffic intersection controller unit 108 may transmit the imminent crash warning received from the vehicle or generated from the BSM and PSM information to the application user over the cellular network 106. The imminent crash warning may alert the pedestrian 1302 to an oncoming vehicle before, for example, stepping into a crosswalk in front of the oncoming vehicle.

Figure 15:
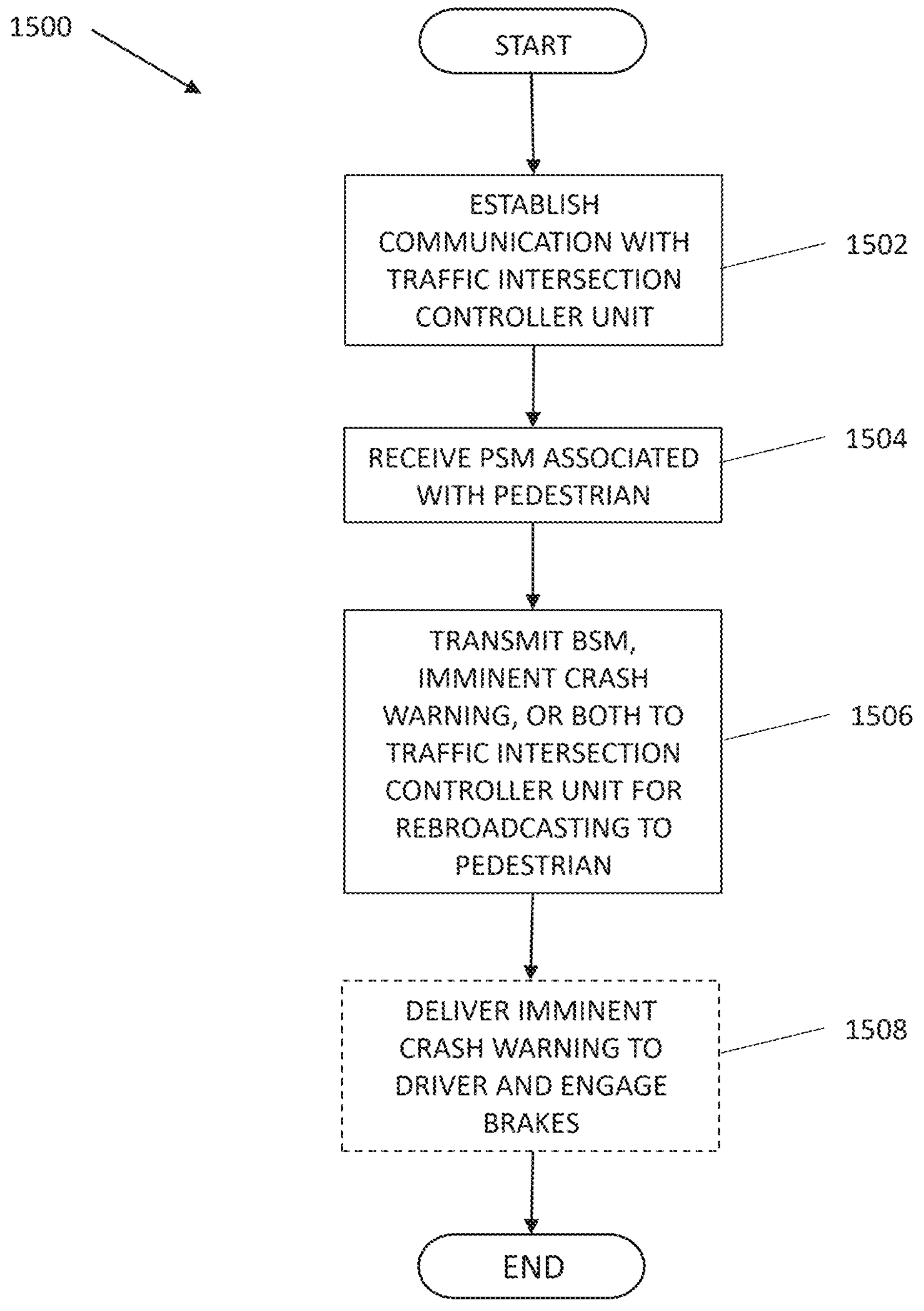
FIG. 15 is a flowchart illustrating a process for establishing communication between devices operating with incompatible communication schemes, according to one aspect of the present disclosure.

FIG. 15 is a flowchart illustrating a process 1500 for establishing communication between devices operating with incompatible communication schemes, according to one aspect of the present disclosure. According to one aspect of the present disclosure, the process 1500 begins at block 1502, where the vehicle establishes communication with the traffic intersection controller unit 108. The communication may be established using a point-to-point communication scheme. In some examples, the communication is established when the vehicle is in point-to-point communication range of the traffic intersection controller unit 108.

At block 1504, the process 1500 involves the vehicle receiving a PSM associated with a pedestrian from the traffic intersection controller unit 108. In an example, the traffic intersection controller unit 108 receives the PSM from the pedestrian through the cellular network 106 and rebroadcasts the PSM to the vehicle using the point-to-point communication scheme. The PSM may indicate location, direction of travel, and speed of travel of the pedestrian.

At block 1506, the process 1500 involves the vehicle transmitting a BSM of the vehicle, an imminent crash warning, or both to the traffic intersection controller unit for rebroadcasting to the pedestrian. The BSM may include location, direction of travel, and speed of travel of the vehicle. In some examples, the vehicle may process the PSM information from the pedestrian with the BSM information of the vehicle and determine that a collision between the vehicle and the pedestrian is imminent. In such an example, the vehicle may transmit the imminent crash warning with or in place of the BSM for the traffic intersection controller unit 108 to rebroadcast to the pedestrian. In additional examples, the traffic intersection controller unit 108 may process the PSM and BSM information to determine whether the collision is imminent, and the traffic intersection controller unit 108 may transmit the imminent crash warning to the pedestrian. In an additional example, the traffic intersection controller unit 108 may rebroadcast the BSM information to the pedestrian, and a mobile device may determine whether the collision is imminent and generate the imminent crash warning for the pedestrian.

At block 1508, the process 1500 optionally involves the vehicle delivering the imminent crash warning to a driver of the vehicle and engaging brakes of the vehicle. In some examples, such as when a vehicle operating system controls autonomous-driving operations, the vehicle operating system may also enact other evasive maneuvers to avoid the likely collision with the pedestrian.

While FIGS. 14 and 15 describe the processes 1400 and 1500 for establishing communication between a vehicle and a mobile electronic device with incompatible communication schemes, similar techniques may be used for establishing communication between a vehicle or a mobile electronic device and any other traffic related device with an incompatible communication scheme. For example, processes similar to the processes 1400 and 1500 may be established such that a vehicle or a mobile electronic device is able to receive SPAT messages from traffic lights that are rebroadcasted by the traffic signal intersection controller unit 108. Further, the vehicle or the mobile electronic device may receive message sign readouts, statuses of railroad crossings, or any other traffic related messages through rebroadcasted signals from the traffic intersection controller unit 108.

Exemplary Embodiments

According to various aspects of the present disclosure, the system described herein may be implemented in various environments and scenarios. For example, the system may be implemented to provide users notifications relating to school zones and the appropriate speed for traveling therein, work zones and the appropriate speed for traveling therein, stopped school buses, occupied railroad crossings, nearby/approaching emergency vehicles, high accident areas, etc. In further embodiments, the system may present the user notifications if it is determined, via GPS location, that the user is travelling the wrong direction on a one way roadway, if the user is approaching a stop sign or occupied crosswalk at a speed that is not indicative of an intent to stop, etc.

Exemplary Architecture

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

CONCLUSION

Aspects, features, and benefits of the claimed embodiment(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the claimed embodiments to the precise forms disclosed. Many modifications and variations are possible in light of the above teaching.

The embodiments were chosen and described in order to explain the principles of the claimed embodiments and their practical application so as to enable others skilled in the art to utilize the claimed embodiments and various embodiments and with various modifications as are suited to the particular use contemplated. Alternative embodiments will become apparent to those skilled in the art to which the present embodiments pertain without departing from their spirit and scope. Accordingly, the scope of the present embodiments is defined by the appended claims rather than the foregoing description and the exemplary embodiments described therein.

What is claimed is:

1. A computer-implemented method in which one or more processing devices perform operations comprising:

receiving, at a traffic controller unit associated with a traffic-signaling device, information associated with a traffic-related triggering event;

verifying that the information indicates an occurrence of the traffic-related triggering event at the traffic-signaling device;

determining whether movement relative to the traffic-signaling device of any of a plurality of traveler devices is or will be affected by the traffic-related triggering event, wherein each traveler device comprises a computing device associated with a motor vehicle, a cyclist, or a pedestrian;

identifying one or more affected traveler devices, wherein each of the one or more affected traveler devices is one of the plurality of traveler devices that is or will be affected by the traffic-related triggering event;

in response to (i) verifying the occurrence of the traffic-related triggering event and (ii) identifying the one or more affected traveler devices, outputting instructions for the traffic controller unit to transmit one or more signal, phase, and timing (SPAT) messages of the traffic-signaling device to the one or more affected traveler devices;

identifying, at one of the one or more affected traveler devices, at least one relevant SPAT message of the one or more SPAT messages based on an identifier associated with an intersection corresponding to the traffic-signaling device; and generating, at the one of one or more affected traveler devices, at least one of: a visual indicator on a user interface of the one of one or more affected traveler devices or an audible alert from the one of one or more affected traveler devices, wherein the visual indicator or the audible alert includes information corresponding to the traffic-related triggering event based on the at least one relevant SPAT message.

2. The computer-implemented method of claim 1, wherein the traffic-related triggering event comprises detection of an approach of a pedestrian or a motor vehicle at the traffic-signaling device based at least in part on data received from a traveler device associated with the pedestrian or a traveler device associated with the motor vehicle, respectively.

3. The computer-implemented method of claim 2, wherein at least one of the one or more affected traveler devices is located on the pedestrian or on the motor vehicle and is configured to receive at least one of the one or more SPAT messages from the traffic controller unit.

4. The computer-implemented method of claim 1, wherein the traffic-related triggering event comprises (i) a change to a present or future state of a light at the traffic-signaling device or (ii) exceeding a predetermined signal timer at the traffic-signaling device, wherein the predetermined signal timer corresponds to a particular traffic light state.

5. The computer-implemented method of claim 1, wherein the information associated with the traffic-related triggering event comprises travel-related information messages received from a first traveler device located on a pedestrian or a second traveler device located on a motor vehicle.

6. The computer-implemented method of claim 5, wherein the travel-related information messages comprise data relating to a past or current traffic-related activity of the motor vehicle, and wherein the data comprises vehicle position, vehicle speed, vehicle heading, vehicle acceleration, vehicle size, vehicle mass, vehicle steering wheel angle, vehicle braking data, and associated time stamps.

7. The computer-implemented method of claim 5, wherein the travel-related information messages comprise data relating to a past or current traffic-related activity of the pedestrian, and wherein the data comprises pedestrian position, pedestrian speed, pedestrian heading, pedestrian acceleration, and associated time stamps.

8. The computer-implemented method of claim 1, wherein outputting the instructions for the traffic controller unit to transmit the one or more SPAT messages of the traffic-signaling device to the one or more affected traveler devices comprises:

transmitting the one or more SPAT messages to a cloud-based server, wherein the cloud-based server is configured to communicate with the one or more affected traveler devices.

9. The computer-implemented method of claim 1, wherein the one or more SPAT messages comprises a future status of the traffic-signaling device, a current status of the traffic-signaling device, or both.

10. The computer-implemented method of claim 1, wherein the traffic-related triggering event is a likely collision between at least two of the plurality of traveler devices.

11. The computer-implemented method of claim 10, wherein at least one of the one or more SPAT messages comprises instructions for avoiding the likely collision.

12. The computer-implemented method of claim 11, wherein the at least one of the one or more SPAT messages instructs a controlling device of a motor vehicle to engage a braking system of the motor vehicle.

13. A system comprising:

a traffic-signaling device;

a traffic controller unit associated with the traffic-signaling device, wherein the traffic controller unit comprises:

a processor; and a non-transitory computer-readable medium having instructions stored thereon, the instructions being executable by the processor for performing operations comprising:

receiving information associated with a traffic-related triggering event;

verifying that the information indicates an occurrence of the traffic-related triggering event;

determining whether movement relative to the traffic-signaling device of any of a plurality of traveler devices is or will be affected by the traffic-related triggering event, wherein each traveler device comprises a computing device associated with a motor vehicle, a cyclist, or a pedestrian;

identifying one or more affected traveler devices, wherein each of the one or more affected traveler devices is one of the plurality of traveler devices that is or will be affected by the traffic-related triggering event; and in response to (i) verifying the occurrence of the traffic-related triggering event and (ii) identifying the one or more affected traveler devices, outputting instructions for the traffic controller unit to transmit one or more signal, phase, and timing (SPAT) messages of the traffic-signaling device to the one or more affected traveler devices; and one of the one or more affected traveler devices configured to:

identify at least one relevant SPAT message of the one or more SPAT messages based on an identifier associated with an intersection corresponding to the traffic-signaling device; and generate at least one of: a visual indicator on a user interface of the one of one or more affected traveler devices or an audible alert from the one of one or more affected traveler devices, wherein the visual indicator or the audible alert includes information corresponding to the traffic-related triggering event based on the at least one relevant SPAT message.

14. The system of claim 13, wherein the traffic-related triggering event comprises detection of an approach of a pedestrian or a motor vehicle at the traffic-signaling device based at least in part on data received from a traveler device associated with the pedestrian or a traveler device associated with the motor vehicle, respectively.

15. The system of claim 13, wherein at least one of the one or more affected traveler devices is located on the pedestrian or on the motor vehicle and is configured to receive at least one of the one or more SPAT messages from the traffic controller unit.

16. The system of claim 13, wherein the traffic-related triggering event comprises (i) a change to a present or future state of a light at the traffic-signaling device or (ii) exceeding a predetermined signal timer at the traffic-signaling device, wherein the predetermined signal timer corresponds to a particular traffic light state.

17. The system of claim 13, wherein the information associated with the traffic-related triggering event comprises travel-related information messages received from a first traveler device located on a pedestrian or a second traveler device located on a motor vehicle.

18. The system of claim 17, wherein the travel-related information messages comprise data relating to a past or current traffic-related activity of the motor vehicle, and wherein the data comprises vehicle position, vehicle speed, vehicle heading, vehicle acceleration, vehicle size, vehicle mass, vehicle steering wheel angle, vehicle braking data, and associated time stamps.

19. The system of claim 17, wherein the travel-related information messages comprise data relating to a past or current traffic-related activity of the pedestrian, and wherein the data comprises pedestrian position, pedestrian speed, pedestrian heading, pedestrian acceleration, and associated time stamps.

20. The system of claim 13, wherein the traffic controller unit is configured to transmit the one or more SPAT messages using radio frequency (RF) signals and cellular signals.

21. A non-transitory computer-readable medium having program code that is stored thereon, the program code being executable by one or more processing devices for performing operations comprising:

receiving information associated with a traffic-related triggering event;

verifying that the information indicates an occurrence of the traffic-related triggering event;

determining whether movement relative to a traffic-signaling device of any of a plurality of traveler devices is or will be affected by the traffic-related triggering event, wherein each traveler device comprises a computing device associated with a motor vehicle, a cyclist, or a pedestrian; identifying one or more affected traveler devices, wherein each of the one or more affected traveler devices is one of the plurality of traveler devices that is or will be affected by the traffic-related triggering event;

in response to (i) verifying the occurrence of the traffic-related triggering event and (ii) identifying the one or more affected traveler devices, outputting instructions for a traffic controller unit to transmit one or more signal, phase, and timing (SPAT) messages of the traffic-signaling device to the one or more affected traveler devices;

identifying, at one of the one or more affected traveler devices, at least one relevant SPAT message of the one or more SPAT messages based on an identifier associated with an intersection corresponding to the traffic-signaling device; and generating, at the one of one or more affected traveler devices, at least one of: a visual indicator on a user interface of the one of one or more affected traveler devices or an audible alert from the one of one or more affected traveler devices, wherein the visual indicator or the audible alert includes information corresponding to the traffic-related triggering event based on the at least one relevant SPAT message.

22. The non-transitory computer-readable medium of claim 21, wherein outputting the instructions for the traffic controller unit to transmit the one or more SPAT messages of the traffic-signaling device to the one or more affected traveler devices comprises:

transmitting the one or more SPAT messages to a cloud-based server, wherein the cloud-based server is configured to communicate with the one or more affected traveler devices.

23. The non-transitory computer-readable medium of claim 21, wherein the traffic-related triggering event comprises (i) a change to a present or future state of a light at the traffic-signaling device, (ii) exceeding a predetermined signal timer at the traffic-signaling device, or (iii) detection of an approach of a pedestrian or a motor vehicle at the traffic-signaling device based at least in part on data received from a traveler device associated with the pedestrian or a traveler device associated with the motor vehicle, respectively.

* * * * *